United States Patent
Yang

(10) Patent No.: US 12,538,138 B2
(45) Date of Patent: Jan. 27, 2026

(54) BEAM INFORMATION DETERMINING METHOD AND APPARATUS, AND ELECTRONIC DEVICE

(71) Applicant: VIVO MOBILE COMMUNICATION CO., LTD., Dongguan (CN)

(72) Inventor: Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 482 days.

(21) Appl. No.: 18/097,487

(22) Filed: Jan. 16, 2023

(65) Prior Publication Data

US 2023/0180023 A1 Jun. 8, 2023

Related U.S. Application Data

(63) Continuation of application No. PCT/CN2021/106521, filed on Jul. 15, 2021.

(30) Foreign Application Priority Data

Jul. 17, 2020 (CN) .......................... 202010694079.8

(51) Int. Cl.
*H04W 16/28* (2009.01)
*H04L 5/00* (2006.01)

(52) U.S. Cl.
CPC ........... *H04W 16/28* (2013.01); *H04L 5/0051* (2013.01)

(58) Field of Classification Search
CPC .............................. H04W 16/28; H04L 5/0051
See application file for complete search history.

(56) References Cited

U.S. PATENT DOCUMENTS

| | | | | |
|---|---|---|---|---|
| 2019/0037605 | A1* | 1/2019 | Agiwal | H04L 5/0048 |
| 2019/0223043 | A1* | 7/2019 | Geng | H04W 76/27 |
| 2019/0313273 | A1 | 10/2019 | Sharma et al. | |
| 2020/0358508 | A1* | 11/2020 | Li | H04L 5/0051 |
| 2021/0168631 | A1* | 6/2021 | Chen | H04W 76/19 |
| 2021/0195570 | A1* | 6/2021 | Zhang | H04L 5/0048 |
| 2021/0320766 | A1* | 10/2021 | Li | H04L 5/0048 |
| 2021/0336712 | A1* | 10/2021 | Yang | H04B 7/063 |
| 2022/0103226 | A1* | 3/2022 | Huang | H04B 7/06964 |

(Continued)

FOREIGN PATENT DOCUMENTS

| | | |
|---|---|---|
| CN | 108401295 A | 8/2018 |
| CN | 108882327 A | 11/2018 |

(Continued)

OTHER PUBLICATIONS

International Search Report issued in corresponding International Application No. PCT/CN2021/106521, mailed Oct. 19, 2021, 6 pages.

(Continued)

*Primary Examiner* — Fahmida S Chowdhury
(74) *Attorney, Agent, or Firm* — IPX PLLC

(57) ABSTRACT

A beam information determining method and electronic devices are provided. The beam information determining method is performed by a terminal, and the method includes: receiving indication information of a network side device; and in a case that a target reference signal corresponding to the indication information does not meet a preset detection condition, rolling back to a preset reference signal for transmission.

19 Claims, 4 Drawing Sheets

Receive indication information from a network side device — 101

If a target reference signal corresponding to the indication information does not meet a preset detection condition, roll back to a preset reference signal for transmission — 102

(56) References Cited

U.S. PATENT DOCUMENTS

| | | | | |
|---|---|---|---|---|
| 2022/0131591 A1* | 4/2022 | Huang | .................. | H04W 24/08 |
| 2022/0338021 A1* | 10/2022 | He | ........................ | H04L 5/0048 |
| 2023/0180023 A1* | 6/2023 | Yang | .................... | H04L 5/0051 |
| | | | | 370/329 |
| 2023/0261724 A1* | 8/2023 | Li | ........................ | H04L 5/0094 |
| | | | | 375/267 |

FOREIGN PATENT DOCUMENTS

| | | | |
|---|---|---|---|
| CN | 110089152 A | 8/2019 | |
| CN | 110312276 A | 10/2019 | |
| CN | 110381587 A | 10/2019 | |
| CN | 110870378 A | 3/2020 | |
| EP | 4185008 A1 * | 5/2023 | ............ H04W 16/28 |
| WO | 2019033072 A1 | 2/2019 | |

OTHER PUBLICATIONS

First Office Action issued in related Chinese Application No. 202010694079.8, mailed May 31, 2022, 18 pages.
Extended European Search Report issued in related European Application No. 21842972.8, mailed Dec. 4, 2023, 8 pages.

* cited by examiner

BEAM INFORMATION DETERMINING METHOD AND APPARATUS, AND ELECTRONIC DEVICE

CROSS-REFERENCE TO RELATED APPLICATIONS

This application is a continuation of International Application No. PCT/CN2021/106521, filed on Jul. 15, 2021, which claims priority to Chinese Patent Application No. 202010694079.8, filed on Jul. 17, 2020. The entire contents of each of the above-referenced applications are expressly incorporated herein by reference.

TECHNICAL FIELD

This application relates to the field of communications technologies, and in particular, to a beam information determining method and apparatus, and an electronic device.

BACKGROUND

In the prior art, when a network instructs to perform beam switching of a downlink or uplink channel or reference signal, after beam switch signaling, a downlink target reference signal corresponding to beam information is sent or an uplink target reference signal corresponding to beam information is received. The network measures the uplink target reference signal, or a terminal measures the downlink target reference signal, and then performs beam switching after obtaining the corresponding beam information by measuring the target reference signal.

If the network sends the beam switching signaling, but the network or User Equipment (UE) does not send a corresponding target Reference Signal (RS) (for example, network congestion, occupation of an unlicensed frequency band, channel shielding, or severe fading), the network and the UE cannot determine what beam information is used for information transmission. Consequently, communication interruption occurs, affecting system performance and user experience.

SUMMARY

Embodiments of this application provide a beam information determining method and apparatus, and an electronic device, to avoid communication interruption.

According to a first aspect, an embodiment of this application provides a beam information determining method. The method is applied to a terminal and includes:
  receiving indication information from a network side device; and
  if a target reference signal corresponding to the indication information does not meet a preset detection condition, rolling back to a preset reference signal for transmission.

According to a second aspect, an embodiment of this application provides a beam information determining method. The method is applied to a network side device and includes:
  sending indication information to a terminal; and
  if a target reference signal corresponding to the indication information does not meet a preset detection condition, rolling back to a preset reference signal for transmission.

According to a third aspect, an embodiment of this application provides a beam information determining apparatus. The apparatus is applied to a terminal and includes:
  a receiving module, configured to receive indication information from a network side device; and
  a first rollback module, configured to: if a target reference signal corresponding to the indication information does not meet a preset detection condition, roll back to a preset reference signal for transmission.

In some embodiments, the indication information is used to indicate beam switching or beam updating of a channel or a reference signal; or
  the indication information is used to indicate switching or updating of a path loss reference signal of a channel or a reference signal.

In some embodiments, if the indication information is used to indicate beam switching or beam updating of a channel or a reference signal,
  the channel is a downlink channel or the reference signal is a downlink reference signal, and beam information of the channel or the reference signal is Transmission Configuration Indicator (TCI) state or Quasi Co-Location (QCL) information; or
  the channel is an uplink channel or the reference signal is an uplink reference signal, and beam information of the channel or the reference signal is spatial relation information.

In some embodiments, if the indication information is used to indicate beam switching or beam updating of a channel or a reference signal,
  the first rollback module is configured to, at a time location T1 after the indication information is received, start transmission or determine whether the target reference signal meets the preset detection condition.

In some embodiments, the time location T1 is any one of the following:
  a first time location at which the terminal receives the indication information;
  a second time location after the terminal receives the indication information, where an interval between the second time location and the first time location is first preset duration;
  a third time location at which the terminal sends acknowledgment information of the indication information; and
  a fourth time location after the terminal sends the acknowledgment information, where an interval between the fourth time location and the third time location is second preset duration.

In some embodiments, if the indication information is used to indicate switching or updating of a path loss reference signal of a channel or a reference signal,
  the first rollback module is configured to, at a time location T2 after the indication information is received, start transmission or determine whether the target reference signal meets the preset detection condition.

In some embodiments, the time location T2 is any one of the following:
  a fifth time location at which the terminal receives the indication information;
  a sixth time location after the terminal receives the indication information, where an interval between the sixth time location and the fifth time location is third preset duration;
  a seventh time location at which the terminal sends acknowledgment information of the indication information;

an eighth time location after the terminal sends the acknowledgment information, where an interval between the eighth time location and the seventh time location is fourth preset duration;

a ninth time location after the terminal sends the acknowledgment information, where an interval between the ninth time location and the seventh time location is N sampling points, N symbols, or N slots, and N is a positive integer; and a tenth time location after the terminal sends the acknowledgment information, where the tenth time location is located after the ninth time location, and an interval between the tenth time location and the ninth time location is fifth preset duration.

In some embodiments, the target reference signal is a target path loss reference signal, and the first rollback module is configured to receive and measure a current path loss reference signal and the target path loss reference signal in a first time period K1.

In some embodiments, a start point of the first time period K1 is a time location at which transmission starts or it is determined whether the target reference signal meets the preset detection condition.

In some embodiments, an end point of the first time period K1 is any one of the following:
  a time location at which it is determined that the target reference signal does not meet the preset detection condition;
  an eleventh time location at which it is determined that the target reference signal meets the preset detection condition; and
  a twelfth time location after the eleventh time location, where an interval between the twelfth time location and the eleventh time location is sixth preset duration, M sampling points, M symbols, or M slots, and M is a positive integer.

In some embodiments, the preset reference signal is a preset path loss reference signal, and the first rollback module is configured to receive and measure a current path loss reference signal and the preset path loss reference signal in a second time period K2.

In some embodiments, a start point of the second time period K2 is any one of the following:
  a thirteenth time location at which it is determined that the target reference signal does not meet the preset detection condition; and
  a fourteenth time location after the thirteenth time location, where an interval between the fourteenth time location and the thirteenth time location is seventh preset duration, L sampling points, L symbols, or L slots, and L is a positive integer.

In some embodiments, an end point of the second time period K2 is a fifteenth time location after the start point of the second time period K2, an interval between the fifteenth time location and the start point is eighth preset duration, S sampling points, S symbols, or S slots, and S is a positive integer.

In some embodiments, the indication information is at least one of the following:
  Radio Resource Control (RRC) signaling for configuring a TCI state of a Physical Downlink Control Channel (PDCCH);
  a Media Access Control (MAC) Control Element (CE) command for activating the TCI state of the PDCCH;
  a MAC CE command for activating a TCI state of a Physical Downlink Shared Channel (PDSCH);
  Downlink Control Information (DCI) signaling for indicating the TCI state of the PDSCH;
  RRC signaling for configuring a TCI state of a Channel State Information-Reference Signal (CSI-RS);
  a MAC CE command for activating the TCI state of the CSI-RS;
  DCI signaling for indicating the TCI state of the CSI-RS;
  RRC signaling for configuring a spatial relation of a Physical Uplink Control Channel (PUCCH);
  a MAC CE command for activating the spatial relation of the PUCCH;
  RRC signaling for configuring a spatial relation of a Sounding Reference Signal (SRS);
  a MAC CE command for activating the spatial relation of the SRS;
  DCI signaling for indicating the spatial relation of the SRS;
  RRC signaling for configuring a path loss reference signal of the PUCCH;
  a MAC CE command for activating the path loss reference signal of the PUCCH; DCI signaling for indicating the path loss reference signal of the PUCCH;
  a MAC CE command for activating a spatial relation of a Physical Uplink Shared Channel (PUSCH);
  RRC signaling for configuring a path loss reference signal of the PUSCH;
  a MAC CE command for activating the path loss reference signal of the PUSCH;
  RRC signaling for configuring a path loss reference signal of the SRS; and
  a MAC CE command for activating the path loss reference signal of the SRS.

In some embodiments, the target reference signal is any one of the following:
  the path loss reference signal;
  a reference signal associated with the path loss reference signal;
  a reference signal associated with the spatial relation;
  a source reference signal in the spatial relation;
  a reference signal associated with the TCI state; and
  a source reference signal in the TCI state.

In some embodiments, the preset detection condition includes any one of the following:
  the number of times that the terminal does not transmit the target reference signal is greater than or equal to a first preset value;
  duration for which the terminal does not transmit the target reference signal is greater than or equal to ninth preset duration;
  the number of times that the terminal does not transmit the target reference signal is greater than or equal to a preset count of a first preset counter; and
  duration for which the terminal does not transmit the target reference signal is greater than or equal to duration of a first preset timer.

In some embodiments, that the terminal does not transmit the target reference signal includes any one of the following:
  the terminal does not send the target reference signal;
  the terminal does not receive the target reference signal; and
  the terminal receives the target reference signal, where a quality evaluation value of the target reference signal is less than or equal to a second preset value.

In some embodiments, the quality evaluation value is any one of the following quality parameters or an average value obtained through a plurality of successive measurements on any one of the following quality parameters:

Reference Signal Received Power (RSRP);
Reference Signal Received Quality (RSRQ);
a Signal to Interference plus Noise Ratio (SINR); and
a Received Signal Strength Indicator (RSSI).

In some embodiments, the apparatus further includes:
a first transmission module, configured to: if the target reference signal corresponding to the indication information meets the preset detection condition, perform transmission according to the target reference signal.

In some embodiments, if the target reference signal corresponding to the indication information does not meet the preset detection condition, the apparatus further includes a first processing module, configured to perform at least one of the following:
stopping transmission of the target reference signal;
stopping beam switching; and
stopping switching or updating of a path loss reference signal.

In some embodiments, the first rollback module is configured to roll back to the preset reference signal for transmission according to a configuration of the network side device or a stipulation in a protocol.

In some embodiments, after the rolling back to a preset reference signal for transmission, the first rollback module is further configured to perform at least one of the following:
transmitting the preset reference signal;
transmitting a first channel or a first reference signal corresponding to the preset reference signal;
transmitting a channel or a reference signal scheduled by the network side device;
transmitting a channel or a reference signal indicated by the indication information; and
performing path loss measurement.

In some embodiments, the preset reference signal is at least one of the following:
a Synchronization Signal Block (SSB) determined by the terminal in a random access process;
a reference signal in a TCI state or a QCL hypothesis of a control resource set with a preset index or identifier;
a reference signal corresponding to a candidate TCI state configured by the network side device or a specified TCI state in a TCI state pool;
a reference signal corresponding to a candidate spatial relation configured by the network side device or a specified spatial relation in a spatial relation pool;
a candidate path loss reference signal configured by the network side device or a specified path loss reference signal in a path loss reference signal pool;
a reference signal in a spatial relation of a PUCCH with a preset index or identifier;
a path loss reference signal of the PUCCH with the preset index or identifier;
a reference signal in a TCI state with a preset index or identifier in TCI states of a PDSCH configured or activated by the network side device;
a reference signal on a preset cell; and
a reference signal on a preset Bandwidth Part (BWP).

In some embodiments, the preset cell is any one of the following:
a current serving cell;
a cell in which the first channel or the first reference signal corresponding to the preset reference signal is located;
a cell in which the preset reference signal is located;
a cell in which the channel or the reference signal scheduled by the network side device is located;
a cell in which the channel or the reference signal indicated by the indication information is located; and
a primary cell.

In some embodiments, the preset reference signal is at least one of the following:
a reference signal corresponding to the same Transmission/Reception Point (TRP) identifier information as a first channel or a first reference signal;
a reference signal corresponding to the same TRP identifier information as a channel or a reference signal scheduled by the network side device;
a reference signal corresponding to the same TRP identifier information as a channel or a reference signal indicated by the indication information;
a first preset reference signal on a TRP on which information is currently transmitted;
a second preset reference signal on a currently activated TRP;
a third preset reference signal corresponding to preset TRP identifier information;
a fourth preset reference signal corresponding to the same TRP identifier information as a reference signal in a current TCI state;
a fifth preset reference signal corresponding to the same TRP identifier information as a reference signal in a current spatial relation;
a sixth preset reference signal corresponding to the same TRP identifier information as a current path loss reference signal; and
a seventh preset reference signal corresponding to a first TCI state, where the first TCI state is a preset TCI state in TCI states corresponding to a first TCI codepoint, and the first TCI codepoint is a preset TCI codepoint in TCI codepoints corresponding to a plurality of TCI states.

According to a fourth aspect, an embodiment of this application provides a beam information determining apparatus. The apparatus is applied to a network side device and includes:
a sending module, configured to send indication information to a terminal; and
a second rollback module, configured to: if a target reference signal corresponding to the indication information does not meet a preset detection condition, roll back to a preset reference signal for transmission.

In some embodiments, the indication information is used to indicate beam switching or beam updating of a channel or a reference signal; or
the indication information is used to indicate switching or updating of a path loss reference signal of a channel or a reference signal.

In some embodiments, if the indication information is used to indicate beam switching or beam updating of a channel or a reference signal,
the channel is a downlink channel or the reference signal is a downlink reference signal, and beam information of the channel or the reference signal is TCI state or QCL information; or
the channel is an uplink channel or the reference signal is an uplink reference signal, and beam information of the channel or the reference signal is spatial relation information.

In some embodiments, if the indication information is used to indicate beam switching or beam updating of a channel or a reference signal,
the second rollback module is configured to, at a time location T3 after the indication information is sent, start transmission or determine whether the target reference signal meets the preset detection condition.

In some embodiments, the time location T3 is any one of the following:
- a sixteenth time location at which the network side device sends the indication information;
- a seventeenth time location after the network side device sends the indication information, where an interval between the seventeenth time location and the sixteenth time location is tenth preset duration;
- an eighteenth time location at which the network side device receives acknowledgment information of the indication information; and
- a nineteenth time location after the network side device receives the acknowledgment information, where an interval between the nineteenth time location and the eighteenth time location is eleventh preset duration.

In some embodiments, if the indication information is used to indicate switching or updating of a path loss reference signal of a channel or a reference signal,
- the second rollback module is configured to, at a time location T4 after the indication information is sent, start transmission or determine whether the target reference signal meets the preset detection condition.

In some embodiments, the time location T4 is any one of the following:
- a twentieth time location at which the network side device sends the indication information;
- a twenty-first time location after the network side device sends the indication information, where an interval between the twenty-first time location and the twentieth time location is twelfth preset duration;
- a twenty-second time location at which the network side device receives acknowledgment information of the indication information;
- a twenty-third time location after the network side device receives the acknowledgment information, where an interval between the twenty-third time location and the twenty-second time location is thirteenth preset duration;
- a twenty-fourth time location after the network side device receives the acknowledgment information, where an interval between the twenty-fourth time location and the twenty-second time location is A sampling points, A symbols, or A slots, and A is a positive integer; and
- a twenty-fifth time location after the network side device receives the acknowledgment information, where the twenty-fifth time location is located after the twenty-fourth time location, and an interval between the twenty-fifth time location and the twenty-fourth time location is fourteenth preset duration.

In some embodiments, the target reference signal is a target path loss reference signal, and the second rollback module is configured to enable the network side device to send a current path loss reference signal and the target path loss reference signal in a first time period K1.

In some embodiments, a start point of the first time period K1 is a time location at which transmission starts or it is determined whether the target reference signal meets the preset detection condition.

In some embodiments, an end point of the first time period K1 is any one of the following:
- a time location at which it is determined that the target reference signal does not meet the preset detection condition;
- a twenty-sixth time location at which it is determined that the target reference signal meets the preset detection condition; and
- a twenty-seventh time location after the twenty-sixth time location, where an interval between the twenty-seventh time location and the twenty-sixth time location is fifteenth preset duration, B sampling points, B symbols, or B slots, and B is a positive integer.

In some embodiments, an end point of the first time period K1 is any one of the following:
- a thirty-first time location after the start point of the first time period K1, where an interval between the thirty-first time location and the start point of the first time period K1 is greater than or equal to duration of a first preset timer, and the first preset timer is a timer that is stipulated in a protocol or configured or obtained by the network side device and that is used by the terminal to determine whether the preset detection condition is met;
- a thirty-second time location after the thirty-first time location, where an interval between the thirty-second time location and the thirty-first time location is nineteenth preset duration;
- a thirty-third time location after the start point of the first time period K1, where the number of times that the network side device sends the current path loss reference signal or the target path loss reference signal between the thirty-third time location and the start point of the first time period K1 is E or is greater than or equal to a preset count of a first preset counter, E is a positive integer stipulated in a protocol or configured by the network side device, and the first preset counter is a counter that is stipulated in the protocol or configured or obtained by the network side device and that is used by the terminal to determine whether the preset detection condition is met; and a thirty-fourth time location after the thirty-third time location, where an interval between the thirty-fourth time location and the thirty-third time location is twentieth preset duration.

In some embodiments, the preset reference signal is a preset path loss reference signal, and the second rollback module is configured to enable the network side device to send a current path loss reference signal and the preset path loss reference signal in a second time period K2.

In some embodiments, a start point of the second time period K2 is any one of the following:
- a twenty-eighth time location at which it is determined that the target reference signal does not meet the preset detection condition; and
- a twenty-ninth time location after the twenty-eighth time location, where an interval between the twenty-ninth time location and the twenty-eighth time location is sixteenth preset duration, C sampling points, C symbols, or C slots, and C is a positive integer.

In some embodiments, an end point of the second time period K2 is a thirtieth time location after the start point of the second time period K2, an interval between the thirtieth time location and the start point is seventeenth preset duration, D sampling points, D symbols, or D slots, and D is a positive integer.

In some embodiments, an end point of the second time period K2 is any one of the following:
- a thirty-fifth time location after the start point of the second time period K2, where an interval between the thirty-fifth time location and the start point of the second time period K2 is greater than or equal to duration of a first preset timer, and the first preset timer is a timer that is stipulated in a protocol or configured or obtained by the network side device and that is used by the terminal to determine whether the preset detection condition is met;

a thirty-sixth time location after the thirty-fifth time location, where an interval between the thirty-sixth time location and the thirty-fifth time location is twenty-first preset duration;

a thirty-seventh time location after the start point of the second time period K2, where the number of times that the network side device sends the current path loss reference signal or the preset path loss reference signal between the thirty-seventh time location and the start point of the second time period K2 is F or is greater than or equal to a preset count of a first preset counter, F is a positive integer stipulated in a protocol or configured by the network side device, and the first preset counter is a counter that is stipulated in the protocol or configured or obtained by the network side device and that is used by the terminal to determine whether the preset detection condition is met; and a thirty-eighth time location after the thirty-seventh time location, where an interval between the thirty-eighth time location and the thirty-seventh time location is twenty-second preset duration.

In some embodiments, the indication information is at least one of the following:

RRC signaling for configuring a TCI state of a PDCCH;

a MAC CE command for activating the TCI state of the PDCCH;

a MAC CE command for activating a TCI state of a PDSCH;

DCI signaling for indicating the TCI state of the PDSCH;

RRC signaling for configuring a TCI state of a CSI-RS;

a MAC CE command for activating the TCI state of the CSI-RS;

DCI signaling for indicating the TCI state of the CSI-RS;

RRC signaling for configuring a spatial relation of a PUCCH;

a MAC CE command for activating the spatial relation of the PUCCH;

RRC signaling for configuring a spatial relation of an SRS;

a MAC CE command for activating the spatial relation of the SRS;

DCI signaling for indicating the spatial relation of the SRS;

RRC signaling for configuring a path loss reference signal of the PUCCH;

a MAC CE command for activating the path loss reference signal of the PUCCH;

DCI signaling for indicating the path loss reference signal of the PUCCH;

a MAC CE command for activating a spatial relation of a PUSCH;

RRC signaling for configuring a path loss reference signal of the PUSCH;

a MAC CE command for activating the path loss reference signal of the PUSCH;

RRC signaling for configuring a path loss reference signal of the SRS; and a MAC CE command for activating the path loss reference signal of the SRS.

In some embodiments, the target reference signal is any one of the following:

the path loss reference signal;

a reference signal associated with the path loss reference signal;

a reference signal associated with the spatial relation;

a source reference signal in the spatial relation;

a reference signal associated with the TCI state; and a source reference signal in the TCI state.

In some embodiments, the preset detection condition includes any one of the following:

the number of times that the network side device does not transmit the target reference signal is greater than or equal to a third preset value;

duration for which the network side device does not transmit the target reference signal is greater than or equal to eighteenth preset duration;

the number of times that the network side device does not transmit the target reference signal is greater than or equal to a preset count of a second preset counter; and duration for which the network side device does not transmit the target reference signal is greater than or equal to duration of a second preset timer.

In some embodiments, that the network side device does not transmit the target reference signal includes any one of the following:

the network side device does not send the target reference signal;

the network side device does not receive the target reference signal; and a quality evaluation value of the target reference signal received by the network side device is less than or equal to a fourth preset value.

In some embodiments, the quality evaluation value is any one of the following quality parameters or an average value obtained through a plurality of successive measurements on any one of the following quality parameters:

RSRP;

RSRQ;

an SINR; and an RSSI.

In some embodiments, the apparatus further includes:

a second transmission module, configured to: if the target reference signal corresponding to the indication information meets the preset detection condition, perform transmission according to the target reference signal.

In some embodiments, if the target reference signal corresponding to the indication information does not meet the preset detection condition, the apparatus further includes a second processing module, configured to perform at least one of the following:

stopping transmission of the target reference signal;

instructing the terminal to stop beam switching;

stopping beam switching; and stopping switching or updating of a path loss reference signal.

In some embodiments, the second rollback module is configured to roll back to the preset reference signal for transmission according to a configuration of the network side device or a stipulation in a protocol.

In some embodiments, after the rolling back to a preset reference signal for transmission, the second rollback module is further configured to perform at least one of the following:

transmitting the preset reference signal;

transmitting a second channel or a second reference signal corresponding to the preset reference signal;

transmitting a scheduled channel or reference signal; and transmitting a channel or a reference signal indicated by the indication information.

In some embodiments, the preset reference signal is at least one of the following:
- an SSB determined by the terminal in a random access process;
- a reference signal in a TCI state or a QCL hypothesis of a control resource set with a preset index or identifier;
- a reference signal corresponding to a candidate TCI state configured by the network side device or a specified TCI state in a TCI state pool;
- a reference signal corresponding to a candidate spatial relation configured by the network side device or a specified spatial relation in a spatial relation pool;
- a candidate path loss reference signal configured by the network side device or a specified path loss reference signal in a path loss reference signal pool;
- a reference signal in a spatial relation of a PUCCH with a preset index or identifier;
- a path loss reference signal of the PUCCH with the preset index or identifier;
- a reference signal in a TCI state with a preset index or identifier in TCI states of a PDSCH configured or activated by the network side device;
- a reference signal on a preset cell; and
- a reference signal on a preset BWP.

In some embodiments, the preset cell is any one of the following:
- a current serving cell;
- a cell in which the second channel or the second reference signal corresponding to the preset reference signal is located;
- a cell in which the preset reference signal is located;
- a cell in which the channel or the reference signal scheduled by the network side device is located;
- a cell in which the channel or the reference signal indicated by the indication information is located; and
- a primary cell.

In some embodiments, the preset reference signal is at least one of the following:
- a reference signal corresponding to the same TRP identifier information as a second channel or a second reference signal;
- a reference signal corresponding to the same TRP identifier information as a channel or a reference signal scheduled by the network side device;
- a reference signal corresponding to the same TRP identifier information as a channel or a reference signal indicated by the indication information;
- an eighth preset reference signal on a TRP on which information is currently transmitted;
- a ninth preset reference signal on a currently activated TRP;
- a tenth preset reference signal corresponding to preset TRP identifier information;
- an eleventh preset reference signal corresponding to the same TRP identifier information as a reference signal in a current TCI state;
- a twelfth preset reference signal corresponding to the same TRP identifier information as a reference signal in a current spatial relation;
- a thirteenth preset reference signal corresponding to the same TRP identifier information as a current path loss reference signal; and
- a fourteenth preset reference signal corresponding to a second TCI state, where the second TCI state is a preset TCI state in TCI states corresponding to a second TCI codepoint, and the second TCI codepoint is a preset TCI codepoint in TCI codepoints corresponding to a plurality of TCI states.

According to a fifth aspect, an embodiment of this application further provides an electronic device, including a processor, a memory, and a program or an instruction that is stored in the memory and that can be run on the processor, where when the program or the instruction is executed by the processor, the steps of the foregoing method are implemented.

According to a sixth aspect, an embodiment of this application provides a readable storage medium. The readable storage medium stores a program or an instruction, and when the program or the instruction is executed by a processor, the steps of the foregoing method are implemented.

According to a seventh aspect, an embodiment of this application provides a chip. The chip includes a processor and a communications interface, the communications interface is coupled to the processor, and the processor is configured to run a program or an instruction to implement the method in the first aspect.

In the embodiments of this application, a terminal receives indication information from a network side device, and rolls back to a preset reference signal for transmission if a target reference signal corresponding to the indication information does not meet a preset detection condition, so that the network side device and the terminal correctly select a reference signal required for beam switching or path loss measurement, thereby ensuring communication continuity and avoiding communication interruption.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may derive other drawings from these accompanying drawings without creative efforts.

DETAILED DESCRIPTION

Figure 1:
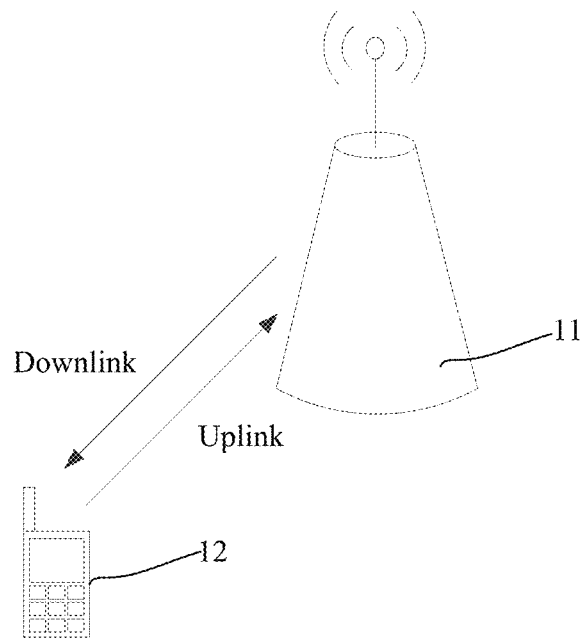
FIG. 1 is a schematic diagram of a wireless communications system.

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that the data used in such a way is interchangeable in proper circumstances so that the embodiments of this application can be implemented in an order other than the order illustrated or described herein. In addition, in the specification and the claims, "and/or" represents at least one of connected objects, and a character "/" generally represents an "or" relationship between associated objects.

The technology described in this specification is not limited to a Long Term Evolution (LTE)/LTE-Advanced (LTE-A) system, and can also be used in various wireless communications systems such as Code Division Multiple Access (CDMA), Time Division Multiple Access (TDMA), Frequency Division Multiple Access (FFDMA), Orthogonal Frequency Division Multiple Access (OFDMA), Single-carrier Frequency-Division Multiple Access (SC-FDMA), and another system. The terms "system" and "network" are often used interchangeably. The CDMA system may implement wireless technologies such as CDMA2000 and Universal Terrestrial Radio Access (UTRA). UTRA includes Wideband Code Division Multiple Access (WCDMA) and other CDMA variants. The TDMA system can implement radio technologies such as Global System for Mobile Communications (GSM). The OFDMA system can implement radio technologies such as Ultra Mobile Broadband (UMB), Evolved-UTRA (E-UTRA), IEEE 802.11 (Wi-Fi), IEEE 802.16 (WiMAX), IEEE 802.20, and Flash-OFDM. UTRA and E-UTRA are parts of a Universal Mobile Telecommunications System (UMTS). LTE and more advanced LTE (for example, LTE-A) are new UMTS versions using E-UTRA. UTRA, E-UTRA, UMTS, LTE, LTE-A, and GSM are described in the literature from an organization called 3rd Generation Partnership Project (3GPP). CDMA2000 and UMB are described in the literature from an organization called "3rd Generation Partnership Project 2" (3GPP2). The technologies described herein can be used both in the systems and radio technologies mentioned above, and can also be used in other systems and radio technologies. However, the following descriptions describe an NR system for example purposes, and NR terms are used in most of the following descriptions, although these techniques can also be applied to an application other than an NR system application.

The following description provides examples without limiting the scope, applicability, or configuration set forth in the claims. The functions and arrangements of the elements under discussion may be changed without departing from the spirit and scope of the present disclosure. In the examples, various procedures or components may be appropriately omitted, replaced, or added. For example, the described method may be performed in an order different from that described, and steps may be added, omitted, or combined. In addition, features described with reference to some examples may be combined in other examples.

Referring to FIG. 1, FIG. 1 is a block diagram of a wireless communications system to which embodiments of this application can be applied. The wireless communications system includes a terminal 11 and a network side device 12. The terminal 11 may also be referred to as a terminal device to UE. The terminal 11 may be a terminal side device such as a mobile phone, a tablet personal computer, a laptop computer, a Personal Digital Assistant (PDA), a Mobile Internet Device (MID), a wearable device, or an in-vehicle device. It should be noted that a specific type of the terminal 11 is not limited in the embodiments of this application. The network side device 12 may be a base station or a core network. The base station may be a base station of 5G or a later version (for example, gNB or 5G NR NB), or a base station in another communications system (for example, an eNB, a WLAN access point, or another access point), or a location server (for example, an E-SMLC or an Location Manager Function (LMF)). The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specified technical term. It should be noted that, in the embodiments of this application, only a base station in an NR system is used as an example, but a specific type of the base station and a specific communications system are not limited in the embodiments of this application.

Wireless access technology standards such as LTE/LTE-A are all built based on a Multiple-Input Multiple-Output (MIMO) technology and an Orthogonal Frequency Division Multiplexing (OFDM) technology. In the MIMO technology, a peak rate and system spectrum utilization are improved by using a spatial degree of freedom that can be obtained by a multi-antenna system.

Dimensions of the MIMO technology are constantly expanded. In some communications protocols, a maximum of four layers of MIMO transmission can be supported. In an enhanced MU-MIMO technology, a maximum of four downlink data layers can be supported in Multi-User MIMO (MU-MIMO) transmission of a Transmission Mode (TM)-8. In some communications protocols, a transmission capability of a Single-User MIMO (SU-MIMO) may be extended to a maximum of eight data layers.

The MIMO technology is advancing in a three-dimensional and massive direction. In a massive MIMO technology, a massive antenna array is used, which can greatly improve system frequency band utilization and support more access users. Therefore, the massive MIMO technology is one of the most promising physical layer technologies in a next-generation mobile communications system.

In the massive MIMO technology, if a full digital array is used, maximum spatial resolution and optimal MU-MIMO performance can be achieved. However, this structure requires a large number of Analog-to-Digital/Digital-to-Analog (AD/DA) conversion components and a large number of complete radio frequency-baseband processing channels, which will be a huge burden both in terms of device costs and baseband processing complexity.

To avoid the foregoing implementation costs and device complexity, a digital-to-analog hybrid beamforming technology emerges, that is, level-1 beamforming is added to a radio frequency signal on a basis of conventional digital domain beamforming near a front end of an antenna system. In a relatively simple manner, analog shaping enables a signal to be sent and a channel to be roughly matched. A dimension of an equivalent channel formed after analog shaping is less than the actual number of antennas. Therefore, the AD/DA conversion component, the number of digital channels, and corresponding baseband processing complexity that are subsequently required can be greatly reduced. Residual interference in analog shaping can be processed again in the digital domain, to ensure quality of MU-MIMO transmission. Compared with full digital beamforming, digital-to-analog hybrid beamforming is a compromise solution between performance and complexity, and has a relatively high practical prospect in a system with a large bandwidth or a large number of antennas in a high frequency band.

In a research on a next-generation communications system later than 4G, an operating frequency band supported by the system is increased to 6 GHz or more, up to about 100 GHz. The high frequency band has relatively rich idle frequency resources, and may provide a larger throughput for data transmission. A wavelength of a high frequency signal is short. Compared with a low frequency band, more antenna array elements can be disposed on an antenna panel of a same size, and a beam with stronger directivity and narrower lobe can be formed by using the beamforming technology. Therefore, combining the massive antenna with high-frequency communication is also one of future trends.

Analog beamforming is transmission in full bandwidth, and each polarization direction array element on an antenna panel of each high-frequency antenna array can only send an analog beam through time division multiplexing. A weighting value of the analog beam is implemented by adjusting a parameter of a device such as a radio frequency front-end phase shifter.

Currently, an analog beamforming vector is generally trained in a polling manner, that is, array elements in each polarization direction of each antenna panel sequentially send a training signal (that is, a candidate beamforming vector) at a specified time through time division multiplexing. After measurement, the terminal feeds back a beam report, so that the network side implements analog beam transmission by using the training signal in a next transmission service. Content of the beam report usually includes a plurality of optimal transmit beam identifiers and corresponding receive power or signal to interference plus noise ratios.

When beam measurement is performed, the network configures a RS resource set, including at least one reference signal resource, such as an SSB resource or a CSI-RS resource. The UE measures an L1-RSRP/L1-SINR of each RS resource, and reports at least one optimal measurement result to the network, where report content includes an SSBRI or a CRI, and a corresponding L1-RSRP/L1-SINR. The report content reflects at least one optimal beam and its quality for the network to determine beam information used to transmit a channel or signal to the UE.

After beam measurement and beam reporting are performed, the network may perform beam indication on downlink and uplink channels or reference signals, to establish a beam link between the network and the UE to implement transmission of the channels or reference signals.

For a beam indication of a PDCCH, the network configures K TCI states for each Control Resource Set (CORESET) by using RRC signaling. When K>1, a MAC CE instructs or activates one TCI state, and when K=1, no additional MAC CE command is required. When the UE monitors the PDCCH, the UE monitors the PDCCH by using same QCL information for all search spaces in the CORESET, that is, a same TCI state is used. A source reference signal (for example, a period CSI-RS resource, a semi-persistent CSI-RS resource, or an SS block) and a UE-specific PDCCH Demodulation Reference Signal (DMRS) port in the TCI state are spatial QCL. The UE may learn, according to the TCI state, which receive beam is used to receive the PDCCH.

For a beam indication of a PDSCH, the network configures M TCI states by using RRC signaling, then activates 2N TCI states by using a MAC CE command, and then notifies a TCI state by using an N-bit TCI field of DCI, where a reference signal in the TCI state and a DMRS port of the PDSCH to be scheduled are QCL. The UE may learn, according to the TCI state, which receive beam is used to receive the PDSCH.

For a beam indication of a CSI-RS, when a CSI-RS type is a periodic CSI-RS, the network configures QCL information for a CSI-RS resource by using RRC signaling. When the CSI-RS type is a semi-persistent CSI-RS, the network activates a CSI-RS resource from an RRC configured CSI-RS resource set by using a MAC CE command, to indicate its QCL information. When the CSI-RS type is an aperiodic CSI-RS, the network configures QCL for the CSI-RS resource by using RRC signaling, and triggers the CSI-RS by using DCI.

For a beam indication of a PUCCH, the network configures spatial relation information for each PUCCH resource by using RRC signaling and a parameter PUCCH-Spatial RelationInfo, and when a plurality of pieces of spatial relation information are configured for the PUCCH resource, one of the plurality of pieces of spatial relation information is activated by using a MAC-CE. When only one piece of spatial relation information is configured for the PUCCH resource, no additional MAC CE command is required.

For a beam indication of a PUSCH, spatial relation information of the PUSCH is used when DCI carried by a PDCCH schedules a PUSCH, each SRS resource indicator (SRI) codepoint of an SRI field in the DCI indicates one SRI, and the SRI is used to indicate spatial relation information of the PUSCH.

For a beam indication of a SRS, when an SRS type is a periodic SRS, the network configures spatial relation information for an SRS resource by using RRC signaling. When the SRS type is a semi-persistent SRS, the network activates one piece in a set of RRC configure spatial relation information by using a MAC CE command. When the SRS type is an aperiodic SRS, the network configures spatial relation information for an SRS resource by using RRC signaling, and may further update spatial relation information of an aperiodic SRS resource by using a MAC CE command.

The beam information mentioned above may also be referred to as beam information, spatial relation information, spatial domain transmission filter information, spatial filter information, TCI state information, QCL information, or a QCL parameter. Downlink beam information may be generally represented by using TCI state information or QCL information. Uplink beam information may be generally represented by using spatial relation information.

Figure 2:
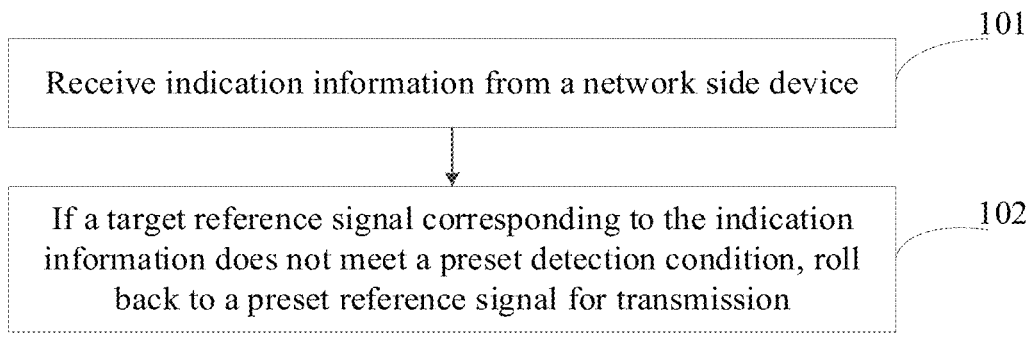
FIG. 2 is a schematic flowchart of a beam information determining method on a terminal side according to an embodiment of this application.

An embodiment of this application provides a beam information determining method, applied to a terminal. As shown in FIG. 2, the method includes:

Step 101: Receive indication information from a network side device.

Step 102: If a target reference signal corresponding to the indication information does not meet a preset detection condition, roll back to a preset reference signal for transmission.

In this embodiment of this application, a terminal receives indication information from a network side device, and rolls back to a preset reference signal for transmission if a target reference signal corresponding to the indication information does not meet a preset detection condition, so that the network side device and the terminal correctly select a reference signal required for beam switching or path loss measurement, thereby ensuring communication continuity and avoiding communication interruption.

In this embodiment, when the network side device instructs UE to perform beam switching or path loss RS switching, if the network side device or the UE does not send a to-be-switched target RS, the network side device or the UE may roll back to a default RS for transmission, so that the network side device and the UE can correctly select an RS required for beam switching or path loss measurement, thereby ensuring communication continuity.

In some embodiments, the indication information is used to indicate beam switching or beam updating of a channel or a reference signal; or the indication information is used to indicate switching or updating of a path loss reference signal of a channel or a reference signal.

In some embodiments, if the indication information is used to indicate beam switching or beam updating of a channel or a reference signal, the channel is a downlink channel or the reference signal is a downlink reference signal, and beam information of the channel or the reference signal is transmission configuration indicator TCI state or quasi co-location QCL information; or the channel is an uplink channel or the reference signal is an uplink reference signal, and beam information of the channel or the reference signal is spatial relation information.

In some embodiments, if the indication information is used to indicate beam switching or beam updating of a channel or a reference signal, at a time location T1 after the indication information is received, starting transmission or determining whether the target reference signal meets the preset detection condition.

In some embodiments, the time location T1 is any one of the following:

a first time location at which the terminal receives the indication information;

a second time location after the terminal receives the indication information, where an interval between the second time location and the first time location is first preset duration;

a third time location at which the terminal sends acknowledgment information of the indication information; and a fourth time location after the terminal sends the acknowledgment information, where an interval between the fourth time location and the third time location is second preset duration.

In some embodiments, if the indication information is used to indicate switching or updating of a path loss reference signal of a channel or a reference signal, at a time location T2 after the indication information is received, starting transmission or determining whether the target reference signal meets the preset detection condition.

In some embodiments, the time location T2 is any one of the following:

a fifth time location at which the terminal receives the indication information;

a sixth time location after the terminal receives the indication information, where an interval between the sixth time location and the fifth time location is third preset duration;

a seventh time location at which the terminal sends acknowledgment information of the indication information;

an eighth time location after the terminal sends the acknowledgment information, where an interval between the eighth time location and the seventh time location is fourth preset duration;

a ninth time location after the terminal sends the acknowledgment information, where an interval between the ninth time location and the seventh time location is N sampling points, N symbols, or N slots, and N is a positive integer; and a tenth time location after the terminal sends the acknowledgment information, where the tenth time location is located after the ninth time location, and an interval between the tenth time location and the ninth time location is fifth preset duration.

In some embodiments, the target reference signal is a target path loss reference signal, and the terminal receives and measures a current path loss reference signal and the target path loss reference signal in a first time period K1. The two path loss reference signals are measured, so that before the network side device and the terminal complete switching from the current path loss reference signal to the target path loss reference signal, the terminal obtains some measured sampling point values of the target path loss reference signal in advance, to obtain a filter path loss value more accurately.

In some embodiments, a start point of the first time period K1 is a time location at which transmission starts or it is determined whether the target reference signal meets the preset detection condition.

In some embodiments, an end point of the first time period K1 is any one of the following:

a time location at which it is determined that the target reference signal does not meet the preset detection condition;

an eleventh time location at which it is determined that the target reference signal meets the preset detection condition; and a twelfth time location after the eleventh time location, where an interval between the twelfth time location and the eleventh time location is sixth preset duration, M sampling points, M symbols, or M slots, and M is a positive integer.

In some embodiments, the preset reference signal is a preset path loss reference signal, and the terminal receives and measures a current path loss reference signal and the preset path loss reference signal in a second time period K2. After determining that the target path loss reference signal does not meet the preset detection condition, the terminal determines that the preset path loss reference signal is to be switched to. The two path loss reference signals are measured, so that before the terminal and the network side device complete switching from the current path loss reference signal to the preset path loss reference signal, the terminal obtains some measured sampling point values of the preset path loss reference signal in advance, to obtain a filter path loss value more accurately.

In some embodiments, a start point of the second time period K2 is any one of the following:
- a thirteenth time location at which it is determined that the target reference signal does not meet the preset detection condition; and
- a fourteenth time location after the thirteenth time location, where an interval between the fourteenth time location and the thirteenth time location is seventh preset duration, L sampling points, L symbols, or L slots, and L is a positive integer.

In some embodiments, an end point of the second time period K2 is a fifteenth time location after the start point of the second time period K2, an interval between the fifteenth time location and the start point is eighth preset duration, S sampling points, S symbols, or S slots, and S is a positive integer.

In some embodiments, the indication information is at least one of the following:
- radio resource control RRC signaling for configuring a TCI state of a physical downlink control channel PDCCH;
- a media access control MAC control element CE command for activating the TCI state of the PDCCH;
- a MAC CE command for activating a TCI state of a physical downlink shared channel PDSCH;
- downlink control information DCI signaling for indicating the TCI state of the PDSCH; RRC signaling for configuring a TCI state of a channel state information-reference signal CSI-RS;
- a MAC CE command for activating the TCI state of the CSI-RS;
- DCI signaling for indicating the TCI state of the CSI-RS;
- RRC signaling for configuring a spatial relation of a physical uplink control channel PUCCH;
- a MAC CE command for activating the spatial relation of the PUCCH;
- RRC signaling for configuring a spatial relation of a sounding reference signal SRS;
- a MAC CE command for activating the spatial relation of the SRS;
- DCI signaling for indicating the spatial relation of the SRS;
- RRC signaling for configuring a path loss reference signal of the PUCCH;
- a MAC CE command for activating the path loss reference signal of the PUCCH;
- DCI signaling for indicating the path loss reference signal of the PUCCH;
- a MAC CE command for activating a spatial relation of a physical uplink shared channel PUSCH;
- RRC signaling for configuring a path loss reference signal of the PUSCH;
- a MAC CE command for activating the path loss reference signal of the PUSCH;
- RRC signaling for configuring a path loss reference signal of the SRS; and
- a MAC CE command for activating the path loss reference signal of the SRS.

In some embodiments, the target reference signal is any one of the following:
- the path loss reference signal;
- a reference signal associated with the path loss reference signal;
- a reference signal associated with the spatial relation;
- a source reference signal in the spatial relation;
- a reference signal associated with the TCI state; and
- a source reference signal in the TCI state.

In some embodiments, the preset detection condition includes any one of the following:
- the number of times that the terminal does not transmit the target reference signal is greater than or equal to a first preset value;
- duration for which the terminal does not transmit the target reference signal is greater than or equal to ninth preset duration;
- the number of times that the terminal does not transmit the target reference signal is greater than or equal to a preset count of a first preset counter; and
- duration for which the terminal does not transmit the target reference signal is greater than or equal to duration of a first preset timer.

In some embodiments, that the terminal does not transmit the target reference signal includes any one of the following:
- the terminal does not send the target reference signal;
- the terminal does not receive the target reference signal; and
- the terminal receives the target reference signal, where a quality evaluation value of the target reference signal is less than or equal to a second preset value.

In some embodiments, the quality evaluation value is any one of the following quality parameters or an average value obtained through a plurality of successive measurements on any one of the following quality parameters:
- reference signal received power RSRP;
- reference signal received quality RSRQ;
- a signal to interference plus noise ratio SINR; and
- a received signal strength indicator RSSI.

In some embodiments, the method further includes:
- if the target reference signal corresponding to the indication information meets the preset detection condition, performing transmission according to the target reference signal.

In some embodiments, if the target reference signal corresponding to the indication information does not meet the preset detection condition, the method further includes at least one of the following:
- stopping transmission of the target reference signal;
- stopping beam switching; and
- stopping switching or updating of a path loss reference signal.

According to the foregoing operations, communication continuity can be ensured and communication interruption can be avoided.

In some embodiments, the rolling back to a preset reference signal for transmission is:
- rolling back to the preset reference signal for transmission according to a configuration of the network side device or a stipulation in a protocol.

In some embodiments, after the rolling back to a preset reference signal for transmission, the method further includes at least one of the following:
- transmitting the preset reference signal;
- transmitting a first channel or a first reference signal corresponding to the preset reference signal;
- transmitting a channel or a reference signal scheduled by the network side device;
- transmitting a channel or a reference signal indicated by the indication information; and
- performing path loss measurement.

When the network side device schedules transmission of a channel or a reference signal, before starting transmission, the terminal may first measure a downlink target RS, and determine corresponding beam information according to a measurement result, so as to transmit the scheduled channel or reference signal. If the network side device does not send the downlink target RS, the terminal cannot detect the downlink target RS. Therefore, the terminal may measure a default RS, that is, a preset RS, and may obtain to-be-switched beam information by measuring the preset RS. Then, this piece of beam information may be used to send or receive the channel or the reference signal scheduled by the network side device. Similarly, the channel or the reference signal scheduled by the network side device may be the channel or the reference signal indicated by the indication information, or may be the first channel or the first reference signal.

When the network side device schedules transmission of a channel or a reference signal, before starting transmission, the network side device may first measure an uplink target RS, and determine corresponding beam information according to a measurement result, so as to transmit the scheduled channel or reference signal. If the terminal does not send the uplink target RS, the network side device cannot detect the uplink target RS. Therefore, the network side device may measure a default RS, that is, a preset RS, and may obtain to-be-switched beam information by measuring the preset RS. Then, this piece of beam information may be used to send or receive the scheduled channel or reference signal. Similarly, the channel or the reference signal scheduled by the network side device may be the channel or the reference signal indicated by the indication information, or may be the first channel or the first reference signal.

Performing path loss measurement means that the network side device instructs switching of a path loss reference signal of a channel or a reference signal. Before starting switching, the terminal may first measure the target path loss reference signal, and determine, according to a measurement result, to switch to the target path loss reference signal for path loss measurement. If the network side device does not send the target path loss reference signal, the terminal cannot detect the target path loss reference signal. Therefore, the terminal may measure a default RS, that is, the preset path loss reference signal, and then the terminal may perform path loss measurement by using the preset path loss reference signal.

In some embodiments, the preset reference signal is at least one of the following:
- a synchronization signal block SSB determined by the terminal in a random access process;
- a reference signal in a TCI state or a QCL hypothesis of a control resource set with a preset index or identifier, where the CORESET with the preset index or identifier may be a CORESET with a minimum CORESET index;
- a reference signal corresponding to a candidate TCI state configured by the network side device or a specified TCI state in a TCI state pool;
- a reference signal corresponding to a candidate spatial relation configured by the network side device or a specified spatial relation in a spatial relation pool;
- a candidate path loss reference signal configured by the network side device or a specified path loss reference signal in a path loss reference signal pool;
- a reference signal in a spatial relation of a PUCCH with a preset index or identifier;
- a path loss reference signal of the PUCCH with the preset index or identifier;
- a reference signal in a TCI state with a preset index or identifier in TCI states of a PDSCH configured or activated by the network side device;
- a reference signal on a preset cell; and
- a reference signal on a preset bandwidth part BWP, where the preset BWP may be an active BWP.

In some embodiments, the preset cell is any one of the following:
- a current serving cell;
- a cell in which the first channel or the first reference signal corresponding to the preset reference signal is located;
- a cell in which the preset reference signal is located;
- a cell in which the channel or the reference signal scheduled by the network side device is located;
- a cell in which the channel or the reference signal indicated by the indication information is located; and
- a primary cell.

In some embodiments, for a multi-TRP scenario, the preset reference signal is at least one of the following:
- a reference signal corresponding to the same transmission/reception point TRP identifier information as a first channel or a first reference signal;
- a reference signal corresponding to the same TRP identifier information as a channel or a reference signal scheduled by the network side device;
- a reference signal corresponding to the same TRP identifier information as a channel or a reference signal indicated by the indication information;
- a first preset reference signal on a TRP on which information is currently transmitted;
- a second preset reference signal on a currently activated TRP;
- a third preset reference signal corresponding to preset TRP identifier information;
- a fourth preset reference signal corresponding to the same TRP identifier information as a reference signal in a current TCI state;
- a fifth preset reference signal corresponding to the same TRP identifier information as a reference signal in a current spatial relation;
- a sixth preset reference signal corresponding to the same TRP identifier information as a current path loss reference signal; and
- a seventh preset reference signal corresponding to a first TCI state, where the first TCI state is a preset TCI state in TCI states corresponding to a first TCI codepoint, and the first TCI codepoint is a preset TCI codepoint in TCI codepoints corresponding to a plurality of TCI states. For example, one TCI codepoint may correspond to one or two TCI states. If three TCI codepoints correspond to two TCI states, a lowest codepoint in the three TCI codepoints may be selected as the preset TCI codepoint. Then one of two TCI states corresponding to the preset TCI codepoint or the two TCI states are selected as the first TCI state, and an RS corresponding to the first TCI state is used as the preset RS.

In the foregoing embodiment, the first preset duration to the ninth preset duration, the first preset counter, the first preset timer, the first preset value, and the second preset value may be configured by the network side device or stipulated in the protocol.

Figure 3:
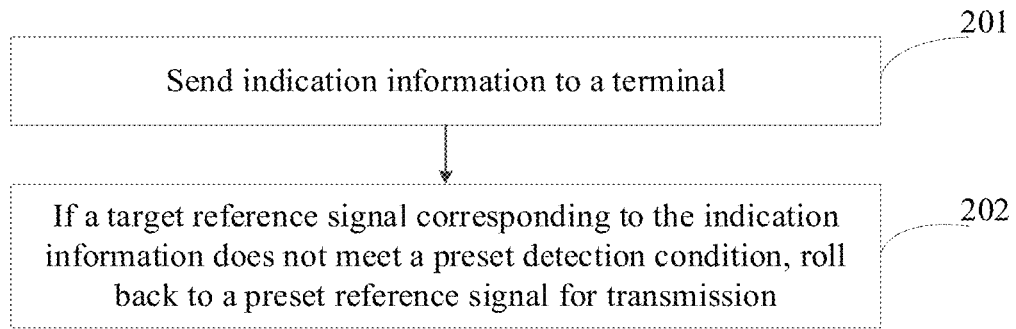
FIG. 3 is a schematic flowchart of a beam information determining method on a network side device side according to an embodiment of this application.

An embodiment of this application provides a beam information determining method, applied to a network side device. As shown in FIG. 3, the method includes:

Step 201: Send indication information to a terminal.

Step 202: If a target reference signal corresponding to the indication information does not meet a preset detection condition, roll back to a preset reference signal for transmission.

In this embodiment of this application, a terminal receives indication information from a network side device, and rolls back to a preset reference signal for transmission if a target reference signal corresponding to the indication information does not meet a preset detection condition, so that the network side device and the terminal correctly select a reference signal required for beam switching or path loss measurement, thereby ensuring communication continuity and avoiding communication interruption.

In some embodiments, the indication information is used to indicate beam switching or beam updating of a channel or a reference signal; or the indication information is used to indicate switching or updating of a path loss reference signal of a channel or a reference signal.

In some embodiments, if the indication information is used to indicate beam switching or beam updating of a channel or a reference signal, the channel is a downlink channel or the reference signal is a downlink reference signal, and beam information of the channel or the reference signal is transmission configuration indicator TCI state or quasi co-location QCL information; or the channel is an uplink channel or the reference signal is an uplink reference signal, and beam information of the channel or the reference signal is spatial relation information.

In some embodiments, if the indication information is used to indicate beam switching or beam updating of a channel or a reference signal, at a time location T3 after the indication information is sent, starting transmission or determining whether the target reference signal meets the preset detection condition.

In some embodiments, the time location T3 is any one of the following:

a sixteenth time location at which the network side device sends the indication information;

a seventeenth time location after the network side device sends the indication information, where an interval between the seventeenth time location and the sixteenth time location is tenth preset duration;

an eighteenth time location at which the network side device receives acknowledgment information of the indication information; and a nineteenth time location after the network side device receives the acknowledgment information, where an interval between the nineteenth time location and the eighteenth time location is eleventh preset duration.

In some embodiments, if the indication information is used to indicate switching or updating of a path loss reference signal of a channel or a reference signal, at a time location T4 after the indication information is sent, starting transmission or determining whether the target reference signal meets the preset detection condition.

In some embodiments, the time location T4 is any one of the following:

a twentieth time location at which the network side device sends the indication information;

a twenty-first time location after the network side device sends the indication information, where an interval between the twenty-first time location and the twentieth time location is twelfth preset duration;

a twenty-second time location at which the network side device receives acknowledgment information of the indication information;

a twenty-third time location after the network side device receives the acknowledgment information, where an interval between the twenty-third time location and the twenty-second time location is thirteenth preset duration;

a twenty-fourth time location after the network side device receives the acknowledgment information, where an interval between the twenty-fourth time location and the twenty-second time location is A sampling points, A symbols, or A slots, and A is a positive integer; and a twenty-fifth time location after the network side device receives the acknowledgment information, where the twenty-fifth time location is located after the twenty-fourth time location, and an interval between the twenty-fifth time location and the twenty-fourth time location is fourteenth preset duration.

In some embodiments, the target reference signal is a target path loss reference signal, and the network side device sends a current path loss reference signal and the target path loss reference signal in a first time period K1. The two path loss reference signals are sent, so that before the terminal and the network side device complete switching from the current path loss reference signal to the target path loss reference signal, the terminal obtains some measured sampling point values of the target path loss reference signal in advance, to obtain a filter path loss value more accurately.

In some embodiments, a start point of the first time period K1 is a time location at which transmission starts or it is determined whether the target reference signal meets the preset detection condition.

In some embodiments, an end point of the first time period K1 is any one of the following:

a time location at which it is determined that the target reference signal does not meet the preset detection condition;

a twenty-sixth time location at which it is determined that the target reference signal meets the preset detection condition; and a twenty-seventh time location after the twenty-sixth time location, where an interval between the twenty-seventh time location and the twenty-sixth time location is fifteenth preset duration, B sampling points, B symbols, or B slots, and B is a positive integer.

In some embodiments, an end point of the first time period K1 is any one of the following:

a thirty-first time location after the start point of the first time period K1, where an interval between the thirty-first time location and the start point of the first time period K1 is greater than or equal to duration of a first preset timer, and the first preset timer is a timer that is stipulated in a protocol or configured or obtained by the network side device and that is used by the terminal to determine whether the preset detection condition is met;

a thirty-second time location after the thirty-first time location, where an interval between the thirty-second time location and the thirty-first time location is nineteenth preset duration;

a thirty-third time location after the start point of the first time period K1, where the number of times that the network side device sends the current path loss reference signal or the target path loss reference signal between the thirty-third time location and the start point of the first time period K1 is E or is greater than or equal to a preset count of a first preset counter, E is a positive integer stipulated in a protocol or configured by the network side device, and the first preset counter is a counter that is stipulated in the protocol or configured or obtained by the network side device and that is used by the terminal to determine whether the preset detection condition is met; and a thirty-fourth time location after the thirty-third time location, where an interval between the thirty-fourth time location and the thirty-third time location is twentieth preset duration.

In some embodiments, the preset reference signal is a preset path loss reference signal, and the network side device sends a current path loss reference signal and the preset path loss reference signal in a second time period K2. After the network side device determines that the target path loss reference signal does not meet the preset detection condition, if the network side device does not send the target path loss reference signal, the network side device determines that the preset path loss reference signal is to be switched to. The two path loss reference signals are sent, so that before the terminal and the network side device complete switching from the current path loss reference signal to the preset path loss reference signal, the terminal obtains some measured sampling point values of the preset path loss reference signal in advance, to obtain a filter path loss value more accurately.

In some embodiments, a start point of the second time period K2 is any one of the following:
- a twenty-eighth time location at which it is determined that the target reference signal does not meet the preset detection condition; and
- a twenty-ninth time location after the twenty-eighth time location, where an interval between the twenty-ninth time location and the twenty-eighth time location is sixteenth preset duration, C sampling points, C symbols, or C slots, and C is a positive integer.

In some embodiments, an end point of the second time period K2 is a thirtieth time location after the start point of the second time period K2, an interval between the thirtieth time location and the start point is seventeenth preset duration, D sampling points, D symbols, or D slots, and D is a positive integer.

In some embodiments, an end point of the second time period K2 is any one of the following:
- a thirty-fifth time location after the start point of the second time period K2, where an interval between the thirty-fifth time location and the start point of the second time period K2 is greater than or equal to duration of a first preset timer, and the first preset timer is a timer that is stipulated in a protocol or configured or obtained by the network side device and that is used by the terminal to determine whether the preset detection condition is met;
- a thirty-sixth time location after the thirty-fifth time location, where an interval between the thirty-sixth time location and the thirty-fifth time location is twenty-first preset duration;
- a thirty-seventh time location after the start point of the second time period K2, where the number of times that the network side device sends the current path loss reference signal or the preset path loss reference signal between the thirty-seventh time location and the start point of the second time period K2 is F or is greater than or equal to a preset count of a first preset counter, F is a positive integer stipulated in a protocol or configured by the network side device, and the first preset counter is a counter that is stipulated in the protocol or configured or obtained by the network side device and that is used by the terminal to determine whether the preset detection condition is met; and
- a thirty-eighth time location after the thirty-seventh time location, where an interval between the thirty-eighth time location and the thirty-seventh time location is twenty-second preset duration.

In some embodiments, the indication information is at least one of the following:
- radio resource control RRC signaling for configuring a TCI state of a physical downlink control channel PDCCH;
- a media access control MAC control element CE command for activating the TCI state of the PDCCH;
- a MAC CE command for activating a TCI state of a physical downlink shared channel PDSCH;
- downlink control information DCI signaling for indicating the TCI state of the PDSCH; RRC signaling for configuring a TCI state of a channel state information-reference signal CSI-RS;
- a MAC CE command for activating the TCI state of the CSI-RS;
- DCI signaling for indicating the TCI state of the CSI-RS;
- RRC signaling for configuring a spatial relation of a physical uplink control channel PUCCH;
- a MAC CE command for activating the spatial relation of the PUCCH;
- RRC signaling for configuring a spatial relation of a sounding reference signal SRS;
- a MAC CE command for activating the spatial relation of the SRS;
- DCI signaling for indicating the spatial relation of the SRS;
- RRC signaling for configuring a path loss reference signal of the PUCCH;
- a MAC CE command for activating the path loss reference signal of the PUCCH;
- DCI signaling for indicating the path loss reference signal of the PUCCH;
- a MAC CE command for activating a spatial relation of a physical uplink shared channel PUSCH;
- RRC signaling for configuring a path loss reference signal of the PUSCH;
- a MAC CE command for activating the path loss reference signal of the PUSCH;
- RRC signaling for configuring a path loss reference signal of the SRS; and
- a MAC CE command for activating the path loss reference signal of the SRS.

In some embodiments, the target reference signal is any one of the following:
- the path loss reference signal;
- a reference signal associated with the path loss reference signal;
- a reference signal associated with the spatial relation;
- a source reference signal in the spatial relation;
- a reference signal associated with the TCI state; and
- a source reference signal in the TCI state.

In some embodiments, the preset detection condition includes any one of the following:
- the number of times that the network side device does not transmit the target reference signal is greater than or equal to a third preset value;
- duration for which the network side device does not transmit the target reference signal is greater than or equal to eighteenth preset duration;

the number of times that the network side device does not transmit the target reference signal is greater than or equal to a preset count of a second preset counter; and duration for which the network side device does not transmit the target reference signal is greater than or equal to duration of a second preset timer.

In some embodiments, that the network side device does not transmit the target reference signal includes any one of the following:

the network side device does not send the target reference signal;

the network side device does not receive the target reference signal; and a quality evaluation value of the target reference signal received by the network side device is less than or equal to a fourth preset value.

In some embodiments, the quality evaluation value is any one of the following quality parameters or an average value obtained through a plurality of successive measurements on any one of the following quality parameters:

reference signal received power RSRP;
reference signal received quality RSRQ;
a signal to interference plus noise ratio SINR; and
a received signal strength indicator RSSI.

In some embodiments, the method further includes:

if the target reference signal corresponding to the indication information meets the preset detection condition, performing transmission according to the target reference signal.

In some embodiments, if the target reference signal corresponding to the indication information does not meet the preset detection condition, the method further includes at least one of the following:

stopping transmission of the target reference signal;
instructing the terminal to stop beam switching;
stopping beam switching; and
stopping switching or updating of a path loss reference signal.

According to the foregoing operations, communication continuity can be maintained and communication interruption can be avoided.

In some embodiments, the rolling back to a preset reference signal for transmission is:

rolling back to the preset reference signal for transmission according to a configuration of the network side device or a stipulation in a protocol.

In some embodiments, after the rolling back to a preset reference signal for transmission, the method further includes at least one of the following:

transmitting the preset reference signal;
transmitting a second channel or a second reference signal corresponding to the preset reference signal;
transmitting a scheduled channel or reference signal; and
transmitting a channel or a reference signal indicated by the indication information.

In some embodiments, the preset reference signal is at least one of the following:

a synchronization signal block SSB determined by the terminal in a random access process;

a reference signal in a TCI state or a QCL hypothesis of a control resource set with a preset index or identifier;

a reference signal corresponding to a candidate TCI state configured by the network side device or a specified TCI state in a TCI state pool;

a reference signal corresponding to a candidate spatial relation configured by the network side device or a specified spatial relation in a spatial relation pool;

a candidate path loss reference signal configured by the network side device or a specified path loss reference signal in a path loss reference signal pool;

a reference signal in a spatial relation of a PUCCH with a preset index or identifier;

a path loss reference signal of the PUCCH with the preset index or identifier;

a reference signal in a TCI state with a preset index or identifier in TCI states of a PDSCH configured or activated by the network side device;

a reference signal on a preset cell; and a reference signal on a preset bandwidth part BWP.

In some embodiments, the preset cell is any one of the following:

a current serving cell;

a cell in which the second channel or the second reference signal corresponding to the preset reference signal is located;

a cell in which the preset reference signal is located;

a cell in which the channel or the reference signal scheduled by the network side device is located;

a cell in which the channel or the reference signal indicated by the indication information is located; and a primary cell.

In some embodiments, the preset reference signal is at least one of the following:

a reference signal corresponding to the same transmission/reception point TRP identifier information as a second channel or a second reference signal;

a reference signal corresponding to the same TRP identifier information as a channel or a reference signal scheduled by the network side device;

a reference signal corresponding to the same TRP identifier information as a channel or a reference signal indicated by the indication information;

an eighth preset reference signal on a TRP on which information is currently transmitted;

a ninth preset reference signal on a currently activated TRP;

a tenth preset reference signal corresponding to preset TRP identifier information;

an eleventh preset reference signal corresponding to the same TRP identifier information as a reference signal in a current TCI state;

a twelfth preset reference signal corresponding to the same TRP identifier information as a reference signal in a current spatial relation;

a thirteenth preset reference signal corresponding to the same TRP identifier information as a current path loss reference signal; and a fourteenth preset reference signal corresponding to a second TCI state, where the second TCI state is a preset TCI state in TCI states corresponding to a second TCI codepoint, and the second TCI codepoint is a preset TCI codepoint in TCI codepoints corresponding to a plurality of TCI states.

In the foregoing embodiment, the tenth preset duration to the twenty-second preset duration, the second preset counter, the second preset timer, the third preset value, the fourth preset value, and the like may be configured by the network side device or stipulated in the protocol.

It should be noted that, the beam information determining method provided in the embodiments of this application may be performed by a beam information determining apparatus, or a module that is in the beam information determining apparatus and that is configured to perform and load the beam information determining method. In the embodiments of this application, an example in which the beam information determining apparatus performs the beam information determining method is used to describe the beam information determining method provided in the embodiments of this application.

Figure 4:
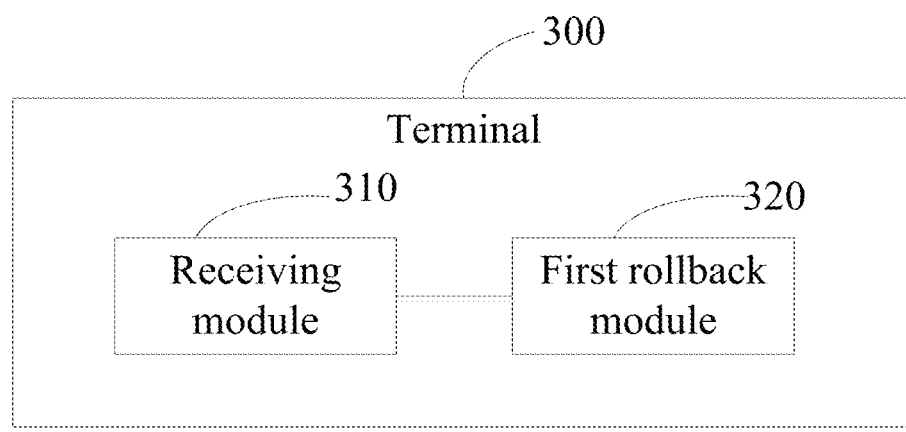
FIG. 4 is a schematic structural diagram of a beam information determining apparatus on a terminal side according to an embodiment of this application.

An embodiment of this application provides a beam information determining apparatus, applied to a terminal 300. As shown in FIG. 4, the apparatus includes:
- a receiving module 310, configured to receive indication information from a network side device; and
- a first rollback module 320, configured to: if a target reference signal corresponding to the indication information does not meet a preset detection condition, roll back to a preset reference signal for transmission.

In this embodiment of this application, a terminal receives indication information from a network side device, and rolls back to a preset reference signal for transmission if a target reference signal corresponding to the indication information does not meet a preset detection condition, so that the network side device and the terminal correctly select a reference signal required for beam switching or path loss measurement, thereby ensuring communication continuity and avoiding communication interruption.

In some embodiments, the indication information is used to indicate beam switching or beam updating of a channel or a reference signal; or
the indication information is used to indicate switching or updating of a path loss reference signal of a channel or a reference signal.

In some embodiments, if the indication information is used to indicate beam switching or beam updating of a channel or a reference signal,
the channel is a downlink channel or the reference signal is a downlink reference signal, and beam information of the channel or the reference signal is transmission configuration indicator TCI state or quasi co-location QCL information; or
the channel is an uplink channel or the reference signal is an uplink reference signal, and beam information of the channel or the reference signal is spatial relation information.

In some embodiments, if the indication information is used to indicate beam switching or beam updating of a channel or a reference signal,
the first rollback module is configured to, at a time location T1 after the indication information is received, start transmission or determine whether the target reference signal meets the preset detection condition.

In some embodiments, the time location T1 is any one of the following:
- a first time location at which the terminal receives the indication information;
- a second time location after the terminal receives the indication information, where an interval between the second time location and the first time location is first preset duration;
- a third time location at which the terminal sends acknowledgment information of the indication information; and
- a fourth time location after the terminal sends the acknowledgment information, where an interval between the fourth time location and the third time location is second preset duration.

In some embodiments, if the indication information is used to indicate switching or updating of a path loss reference signal of a channel or a reference signal,
the first rollback module is configured to, at a time location T2 after the indication information is received, start transmission or determine whether the target reference signal meets the preset detection condition.

In some embodiments, the time location T2 is any one of the following:
- a fifth time location at which the terminal receives the indication information;
- a sixth time location after the terminal receives the indication information, where an interval between the sixth time location and the fifth time location is third preset duration;
- a seventh time location at which the terminal sends acknowledgment information of the indication information;
- an eighth time location after the terminal sends the acknowledgment information, where an interval between the eighth time location and the seventh time location is fourth preset duration;
- a ninth time location after the terminal sends the acknowledgment information, where an interval between the ninth time location and the seventh time location is N sampling points, N symbols, or N slots, and N is a positive integer; and
- a tenth time location after the terminal sends the acknowledgment information, where the tenth time location is located after the ninth time location, and an interval between the tenth time location and the ninth time location is fifth preset duration.

In some embodiments, the target reference signal is a target path loss reference signal, and the first rollback module is configured to receive and measure a current path loss reference signal and the target path loss reference signal in a first time period K1. The two path loss reference signals are measured, so that before the terminal and the network side device complete switching from the current path loss reference signal to the target path loss reference signal, the terminal obtains some measured sampling point values of the target path loss reference signal in advance, to obtain a filter path loss value more accurately.

In some embodiments, a start point of the first time period K1 is a time location at which transmission starts or it is determined whether the target reference signal meets the preset detection condition.

In some embodiments, an end point of the first time period K1 is any one of the following:
- a time location at which it is determined that the target reference signal does not meet the preset detection condition;
- an eleventh time location at which it is determined that the target reference signal meets the preset detection condition; and
- a twelfth time location after the eleventh time location, where an interval between the twelfth time location and the eleventh time location is sixth preset duration, M sampling points, M symbols, or M slots, and M is a positive integer.

In some embodiments, the preset reference signal is a preset path loss reference signal, and the first rollback module is configured to receive and measure a current path loss reference signal and the preset path loss reference signal in a second time period K2. After determining that the target path loss reference signal does not meet the preset detection condition, the terminal determines that the preset path loss reference signal is to be switched to. The two path loss reference signals are measured, so that before the terminal and the network side device complete switching from the current path loss reference signal to the preset path loss reference signal, the terminal obtains some measured sampling point values of the preset path loss reference signal in advance, to obtain a filter path loss value more accurately.

In some embodiments, a start point of the second time period K2 is any one of the following:
- a thirteenth time location at which it is determined that the target reference signal does not meet the preset detection condition; and
- a fourteenth time location after the thirteenth time location, where an interval between the fourteenth time location and the thirteenth time location is seventh preset duration, L sampling points, L symbols, or L slots, and L is a positive integer.

In some embodiments, an end point of the second time period K2 is a fifteenth time location after the start point of the second time period K2, an interval between the fifteenth time location and the start point is eighth preset duration, S sampling points, S symbols, or S slots, and S is a positive integer.

In some embodiments, the indication information is at least one of the following:
- radio resource control RRC signaling for configuring a TCI state of a physical downlink control channel PDCCH;
- a media access control MAC control element CE command for activating the TCI state of the PDCCH;
- a MAC CE command for activating a TCI state of a physical downlink shared channel PDSCH;
- downlink control information DCI signaling for indicating the TCI state of the PDSCH;
- RRC signaling for configuring a TCI state of a channel state information-reference signal CSI-RS;
- a MAC CE command for activating the TCI state of the CSI-RS;
- DCI signaling for indicating the TCI state of the CSI-RS;
- RRC signaling for configuring a spatial relation of a physical uplink control channel PUCCH;
- a MAC CE command for activating the spatial relation of the PUCCH;
- RRC signaling for configuring a spatial relation of a sounding reference signal SRS;
- a MAC CE command for activating the spatial relation of the SRS;
- DCI signaling for indicating the spatial relation of the SRS;
- RRC signaling for configuring a path loss reference signal of the PUCCH;
- a MAC CE command for activating the path loss reference signal of the PUCCH;
- DCI signaling for indicating the path loss reference signal of the PUCCH;
- a MAC CE command for activating a spatial relation of a physical uplink shared channel PUSCH;
- RRC signaling for configuring a path loss reference signal of the PUSCH;
- a MAC CE command for activating the path loss reference signal of the PUSCH; RRC signaling for configuring a path loss reference signal of the SRS; and
- a MAC CE command for activating the path loss reference signal of the SRS.

In some embodiments, the target reference signal is any one of the following:
- the path loss reference signal;
- a reference signal associated with the path loss reference signal;
- a reference signal associated with the spatial relation;
- a source reference signal in the spatial relation;
- a reference signal associated with the TCI state; and
- a source reference signal in the TCI state.

In some embodiments, the preset detection condition includes any one of the following:
- the number of times that the terminal does not transmit the target reference signal is greater than or equal to a first preset value;
- duration for which the terminal does not transmit the target reference signal is greater than or equal to ninth preset duration;
- the number of times that the terminal does not transmit the target reference signal is greater than or equal to a preset count of a first preset counter; and
- duration for which the terminal does not transmit the target reference signal is greater than or equal to duration of a first preset timer.

In some embodiments, that the terminal does not transmit the target reference signal includes any one of the following:
- the terminal does not send the target reference signal;
- the terminal does not receive the target reference signal; and
- the terminal receives the target reference signal, where a quality evaluation value of the target reference signal is less than or equal to a second preset value.

In some embodiments, the quality evaluation value is any one of the following quality parameters or an average value obtained through a plurality of successive measurements on any one of the following quality parameters:
- reference signal received power RSRP;
- reference signal received quality RSRQ;
- a signal to interference plus noise ratio SINR; and
- a received signal strength indicator RSSI.

In some embodiments, the apparatus further includes:
- a first transmission module, configured to: if the target reference signal corresponding to the indication information meets the preset detection condition, perform transmission according to the target reference signal.

In some embodiments, if the target reference signal corresponding to the indication information does not meet the preset detection condition, the apparatus further includes a first processing module, configured to perform at least one of the following:
- stopping transmission of the target reference signal;
- stopping beam switching; and
- stopping switching or updating of a path loss reference signal.

In some embodiments, the first rollback module is configured to roll back to the preset reference signal for transmission according to a configuration of the network side device or a stipulation in a protocol.

In some embodiments, after the rolling back to a preset reference signal for transmission, the first rollback module is further configured to perform at least one of the following:
- transmitting the preset reference signal; transmitting a first channel or a first reference signal corresponding to the preset reference signal;
- transmitting a channel or a reference signal scheduled by the network side device; transmitting a channel or a reference signal indicated by the indication information; and
- performing path loss measurement.

When the network side device schedules transmission of a channel or a reference signal, before starting transmission, the terminal may first measure a downlink target RS, and determine corresponding beam information according to a measurement result, so as to transmit the scheduled channel or reference signal. If the network side device does not send the downlink target RS, the terminal cannot detect the downlink target RS. Therefore, the terminal may measure a default RS, that is, a preset RS, and may obtain to-be-switched beam information by measuring the preset RS. Then, this piece of beam information may be used to send or receive the channel or the reference signal scheduled by the network side device. Similarly, the channel or the reference signal scheduled by the network side device may be the channel or the reference signal indicated by the indication information, or may be the first channel or the first reference signal.

When the network side device schedules transmission of a channel or a reference signal, before starting transmission, the network side device may first measure an uplink target RS, and determine corresponding beam information according to a measurement result, so as to transmit the scheduled channel or reference signal. If the terminal does not send the uplink target RS, the network side device cannot detect the uplink target RS. Therefore, the network side device may measure a default RS, that is, a preset RS, and may obtain to-be-switched beam information by measuring the preset RS. Then, this piece of beam information may be used to send or receive the scheduled channel or reference signal. Similarly, the channel or the reference signal scheduled by the network side device may be the channel or the reference signal indicated by the indication information, or may be the first channel or the first reference signal.

Performing path loss measurement means that the network side device instructs switching of a path loss reference signal of a channel or a reference signal. Before starting switching, the terminal may first measure the target path loss reference signal, and determine, according to a measurement result, to switch to the target path loss reference signal for path loss measurement. If the network side device does not send the target path loss reference signal, the terminal cannot detect the target path loss reference signal. Therefore, the terminal may measure a default RS, that is, the preset path loss reference signal, and then the terminal may perform path loss measurement by using the preset path loss reference signal.

In some embodiments, the preset reference signal is at least one of the following:
a synchronization signal block SSB determined by the terminal in a random access process;
a reference signal in a TCI state or a QCL hypothesis of a control resource set with a preset index or identifier;
a reference signal corresponding to a candidate TCI state configured by the network side device or a specified TCI state in a TCI state pool;
a reference signal corresponding to a candidate spatial relation configured by the network side device or a specified spatial relation in a spatial relation pool;
a candidate path loss reference signal configured by the network side device or a specified path loss reference signal in a path loss reference signal pool;
a reference signal in a spatial relation of a PUCCH with a preset index or identifier;
a path loss reference signal of the PUCCH with the preset index or identifier;
a reference signal in a TCI state with a preset index or identifier in TCI states of a PDSCH configured or activated by the network side device;
a reference signal on a preset cell; and
a reference signal on a preset bandwidth part BWP.

In some embodiments, the preset cell is any one of the following:
a current serving cell;
a cell in which the first channel or the first reference signal corresponding to the preset reference signal is located;
a cell in which the preset reference signal is located;
a cell in which the channel or the reference signal scheduled by the network side device is located;
a cell in which the channel or the reference signal indicated by the indication information is located; and
a primary cell.

In some embodiments, the preset reference signal is at least one of the following:
a reference signal corresponding to the same transmission/reception point TRP identifier information as a first channel or a first reference signal;
a reference signal corresponding to the same TRP identifier information as a channel or a reference signal scheduled by the network side device;
a reference signal corresponding to the same TRP identifier information as a channel or a reference signal indicated by the indication information;
a first preset reference signal on a TRP on which information is currently transmitted;
a second preset reference signal on a currently activated TRP;
a third preset reference signal corresponding to preset TRP identifier information;
a fourth preset reference signal corresponding to the same TRP identifier information as a reference signal in a current TCI state;
a fifth preset reference signal corresponding to the same TRP identifier information as a reference signal in a current spatial relation;
a sixth preset reference signal corresponding to the same TRP identifier information as a current path loss reference signal; and
a seventh preset reference signal corresponding to a first TCI state, where the first TCI state is a preset TCI state in TCI states corresponding to a first TCI codepoint, and the first TCI codepoint is a preset TCI codepoint in TCI codepoints corresponding to a plurality of TCI states.

It should be noted that, the beam information determining method provided in the embodiments of this application may be performed by a beam information determining apparatus, or a module that is in the beam information determining apparatus and that is configured to perform and load the beam information determining method. In the embodiments of this application, an example in which the beam information determining apparatus performs the beam information determining method is used to describe the beam information determining method provided in the embodiments of this application.

The beam information determining apparatus in the embodiments of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic terminal, a wearable device, an Ultra-Mobile Personal Computer (UMPC), a netbook, or a PDA. The non-mobile electronic device may be a Network Attached Storage (NAS), a Personal Computer (PC), a Television (TV), an automated teller machine, or a selfservice machine. This is not specifically limited in the embodiments of this application.

The beam information determining apparatus in the embodiments of this application may be an apparatus with an operating system. The operating system may be an Android operating system, an iOS operating system, or another possible operating system. This is not specifically limited in the embodiments of this application.

Figure 5:
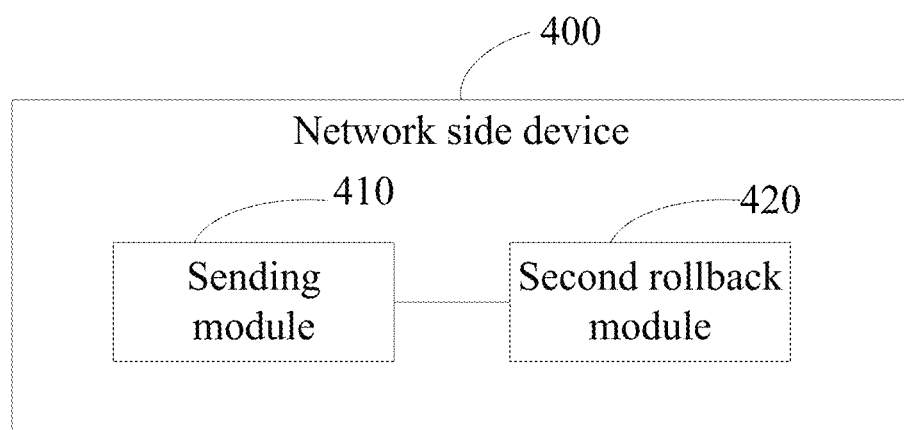
FIG. 5 is a schematic structural diagram of a beam information determining apparatus on a network side device side according to an embodiment of this application.

An embodiment of this application provides a beam information determining apparatus, applied to a network side device 400. As shown in FIG. 5, the apparatus includes:
 a sending module 410, configured to send indication information to a terminal; and
 a second rollback module 420, configured to: if a target reference signal corresponding to the indication information does not meet a preset detection condition, roll back to a preset reference signal for transmission.

In this embodiment of this application, a terminal receives indication information from a network side device, and rolls back to a preset reference signal for transmission if a target reference signal corresponding to the indication information does not meet a preset detection condition, so that the network side device and the terminal correctly select a reference signal required for beam switching or path loss measurement, thereby ensuring communication continuity and avoiding communication interruption.

In some embodiments, the indication information is used to indicate beam switching or beam updating of a channel or a reference signal; or
 the indication information is used to indicate switching or updating of a path loss reference signal of a channel or a reference signal.

In some embodiments, if the indication information is used to indicate beam switching or beam updating of a channel or a reference signal, the channel is a downlink channel or the reference signal is a downlink reference signal, and beam information of the channel or the reference signal is transmission configuration indicator TCI state or quasi co-location QCL information; or
 the channel is an uplink channel or the reference signal is an uplink reference signal, and beam information of the channel or the reference signal is spatial relation information.

In some embodiments, if the indication information is used to indicate beam switching or beam updating of a channel or a reference signal,
 the second rollback module is configured to, at a time location T3 after the indication information is sent, start transmission or determine whether the target reference signal meets the preset detection condition.

In some embodiments, the time location T3 is any one of the following:
 a sixteenth time location at which the network side device sends the indication information;
 a seventeenth time location after the network side device sends the indication information, where an interval between the seventeenth time location and the sixteenth time location is tenth preset duration;
 an eighteenth time location at which the network side device receives acknowledgment information of the indication information; and
 a nineteenth time location after the network side device receives the acknowledgment information, where an interval between the nineteenth time location and the eighteenth time location is eleventh preset duration.

In some embodiments, if the indication information is used to indicate switching or updating of a path loss reference signal of a channel or a reference signal,
 the second rollback module is configured to, at a time location T4 after the indication information is sent, start transmission or determine whether the target reference signal meets the preset detection condition.

In some embodiments, the time location T4 is any one of the following:
 a twentieth time location at which the network side device sends the indication information;
 a twenty-first time location after the network side device sends the indication information, where an interval between the twenty-first time location and the twentieth time location is twelfth preset duration;
 a twenty-second time location at which the network side device receives acknowledgment information of the indication information;
 a twenty-third time location after the network side device receives the acknowledgment information, where an interval between the twenty-third time location and the twenty-second time location is thirteenth preset duration;
 a twenty-fourth time location after the network side device receives the acknowledgment information, where an interval between the twenty-fourth time location and the twenty-second time location is A sampling points, A symbols, or A slots, and A is a positive integer; and
 a twenty-fifth time location after the network side device receives the acknowledgment information, where the twenty-fifth time location is located after the twenty-fourth time location, and an interval between the twenty-fifth time location and the twenty-fourth time location is fourteenth preset duration.

In some embodiments, the target reference signal is a target path loss reference signal, and the second rollback module is configured to enable the network side device to send a current path loss reference signal and the target path loss reference signal in a first time period K1. The two path loss reference signals are sent, so that before the terminal and the network side device complete switching from the current path loss reference signal to the target path loss reference signal, the terminal obtains some measured sampling point values of the target path loss reference signal in advance, to obtain a filter path loss value more accurately.

In some embodiments, a start point of the first time period K1 is a time location at which transmission starts or it is determined whether the target reference signal meets the preset detection condition.

In some embodiments, an end point of the first time period K1 is any one of the following:
 a time location at which it is determined that the target reference signal does not meet the preset detection condition;
 a twenty-sixth time location at which it is determined that the target reference signal meets the preset detection condition; and
 a twenty-seventh time location after the twenty-sixth time location, where an interval between the twenty-seventh time location and the twenty-sixth time location is fifteenth preset duration, B sampling points, B symbols, or B slots, and B is a positive integer.

In some embodiments, an end point of the first time period K1 is any one of the following:
 a thirty-first time location after the start point of the first time period K1, where an interval between the thirty-first time location and the start point of the first time period K1 is greater than or equal to duration of a first preset timer, and the first preset timer is a timer that is stipulated in a protocol or configured or obtained by the network side device and that is used by the terminal to determine whether the preset detection condition is met;

a thirty-second time location after the thirty-first time location, where an interval between the thirty-second time location and the thirty-first time location is nineteenth preset duration;

a thirty-third time location after the start point of the first time period K1, where the number of times that the network side device sends the current path loss reference signal or the target path loss reference signal between the thirty-third time location and the start point of the first time period K1 is E or is greater than or equal to a preset count of a first preset counter, E is a positive integer stipulated in a protocol or configured by the network side device, and the first preset counter is a counter that is stipulated in the protocol or configured or obtained by the network side device and that is used by the terminal to determine whether the preset detection condition is met; and a thirty-fourth time location after the thirty-third time location, where an interval between the thirty-fourth time location and the thirty-third time location is twentieth preset duration.

In some embodiments, the preset reference signal is a preset path loss reference signal, and the second rollback module is configured to enable the network side device to send a current path loss reference signal and the preset path loss reference signal in a second time period K2. After the network side device determines that the target path loss reference signal does not meet the preset detection condition, if the network side device does not send the target path loss reference signal, the network side device determines that the preset path loss reference signal is to be switched to. The two path loss reference signals are sent, so that before the terminal and the network side device complete switching from the current path loss reference signal to the preset path loss reference signal, the terminal obtains some measured sampling point values of the preset path loss reference signal in advance, to obtain a filter path loss value more accurately.

In some embodiments, a start point of the second time period K2 is any one of the following:
  a twenty-eighth time location at which it is determined that the target reference signal does not meet the preset detection condition; and
  a twenty-ninth time location after the twenty-eighth time location, where an interval between the twenty-ninth time location and the twenty-eighth time location is sixteenth preset duration, C sampling points, C symbols, or C slots, and C is a positive integer.

In some embodiments, an end point of the second time period K2 is a thirtieth time location after the start point of the second time period K2, an interval between the thirtieth time location and the start point is seventeenth preset duration, D sampling points, D symbols, or D slots, and D is a positive integer.

In some embodiments, an end point of the second time period K2 is any one of the following:
  a thirty-fifth time location after the start point of the second time period K2, where an interval between the thirty-fifth time location and the start point of the second time period K2 is greater than or equal to duration of a first preset timer, and the first preset timer is a timer that is stipulated in a protocol or configured or obtained by the network side device and that is used by the terminal to determine whether the preset detection condition is met;
  a thirty-sixth time location after the thirty-fifth time location, where an interval between the thirty-sixth time location and the thirty-fifth time location is twenty-first preset duration;
  a thirty-seventh time location after the start point of the second time period K2, where the number of times that the network side device sends the current path loss reference signal or the preset path loss reference signal between the thirty-seventh time location and the start point of the second time period K2 is F or is greater than or equal to a preset count of a first preset counter, F is a positive integer stipulated in a protocol or configured by the network side device, and the first preset counter is a counter that is stipulated in the protocol or configured or obtained by the network side device and that is used by the terminal to determine whether the preset detection condition is met; and
  a thirty-eighth time location after the thirty-seventh time location, where an interval between the thirty-eighth time location and the thirty-seventh time location is twenty-second preset duration.

In some embodiments, the indication information is at least one of the following:
  radio resource control RRC signaling for configuring a TCI state of a physical downlink control channel PDCCH;
  a media access control MAC control element CE command for activating the TCI state of the PDCCH;
  a MAC CE command for activating a TCI state of a physical downlink shared channel PDSCH;
  downlink control information DCI signaling for indicating the TCI state of the PDSCH; RRC signaling for configuring a TCI state of a channel state information-reference signal CSI-RS;
  a MAC CE command for activating the TCI state of the CSI-RS;
  DCI signaling for indicating the TCI state of the CSI-RS;
  RRC signaling for configuring a spatial relation of a physical uplink control channel PUCCH;
  a MAC CE command for activating the spatial relation of the PUCCH;
  RRC signaling for configuring a spatial relation of a sounding reference signal SRS;
  a MAC CE command for activating the spatial relation of the SRS;
  DCI signaling for indicating the spatial relation of the SRS;
  RRC signaling for configuring a path loss reference signal of the PUCCH;
  a MAC CE command for activating the path loss reference signal of the PUCCH;
  DCI signaling for indicating the path loss reference signal of the PUCCH;
  a MAC CE command for activating a spatial relation of a physical uplink shared channel PUSCH;
  RRC signaling for configuring a path loss reference signal of the PUSCH;
  a MAC CE command for activating the path loss reference signal of the PUSCH;
  RRC signaling for configuring a path loss reference signal of the SRS; and
  a MAC CE command for activating the path loss reference signal of the SRS.

In some embodiments, the target reference signal is any one of the following:
- the path loss reference signal;
- a reference signal associated with the path loss reference signal;
- a reference signal associated with the spatial relation;
- a source reference signal in the spatial relation;
- a reference signal associated with the TCI state; and
- a source reference signal in the TCI state.

In some embodiments, the preset detection condition includes any one of the following:
- the number of times that the network side device does not transmit the target reference signal is greater than or equal to a third preset value;
- duration for which the network side device does not transmit the target reference signal is greater than or equal to eighteenth preset duration;
- the number of times that the network side device does not transmit the target reference signal is greater than or equal to a preset count of a second preset counter; and
- duration for which the network side device does not transmit the target reference signal is greater than or equal to duration of a second preset timer.

In some embodiments, that the network side device does not transmit the target reference signal includes any one of the following:
- the network side device does not send the target reference signal;
- the network side device does not receive the target reference signal; and
- a quality evaluation value of the target reference signal received by the network side device is less than or equal to a fourth preset value.

In some embodiments, the quality evaluation value is any one of the following quality parameters or an average value obtained through a plurality of successive measurements on any one of the following quality parameters:
- reference signal received power RSRP;
- reference signal received quality RSRQ;
- a signal to interference plus noise ratio SINR; and
- a received signal strength indicator RSSI.

In some embodiments, the apparatus further includes:
- a second transmission module, configured to: if the target reference signal corresponding to the indication information meets the preset detection condition, perform transmission according to the target reference signal.

In some embodiments, if the target reference signal corresponding to the indication information does not meet the preset detection condition, the apparatus further includes a second processing module, configured to perform at least one of the following:
- stopping transmission of the target reference signal;
- instructing the terminal to stop beam switching;
- stopping beam switching; and
- stopping switching or updating of a path loss reference signal.

In some embodiments, the second rollback module is configured to roll back to the preset reference signal for transmission according to a configuration of the network side device or a stipulation in a protocol.

In some embodiments, after the rolling back to a preset reference signal for transmission, the second rollback module is further configured to perform at least one of the following:
- transmitting the preset reference signal;
- transmitting a second channel or a second reference signal corresponding to the preset reference signal;
- transmitting a scheduled channel or reference signal; and
- transmitting a channel or a reference signal indicated by the indication information.

In some embodiments, the preset reference signal is at least one of the following:
- a synchronization signal block SSB determined by the terminal in a random access process;
- a reference signal in a TCI state or a QCL hypothesis of a control resource set with a preset index or identifier;
- a reference signal corresponding to a candidate TCI state configured by the network side device or a specified TCI state in a TCI state pool;
- a reference signal corresponding to a candidate spatial relation configured by the network side device or a specified spatial relation in a spatial relation pool;
- a candidate path loss reference signal configured by the network side device or a specified path loss reference signal in a path loss reference signal pool;
- a reference signal in a spatial relation of a PUCCH with a preset index or identifier;
- a path loss reference signal of the PUCCH with the preset index or identifier;
- a reference signal in a TCI state with a preset index or identifier in TCI states of a PDSCH configured or activated by the network side device;
- a reference signal on a preset cell; and
- a reference signal on a preset bandwidth part BWP.

In some embodiments, the preset cell is any one of the following:
- a current serving cell;
- a cell in which the second channel or the second reference signal corresponding to the preset reference signal is located;
- a cell in which the preset reference signal is located;
- a cell in which the channel or the reference signal scheduled by the network side device is located;
- a cell in which the channel or the reference signal indicated by the indication information is located; and
- a primary cell.

In some embodiments, the preset reference signal is at least one of the following:
- a reference signal corresponding to the same transmission/reception point TRP identifier information as a second channel or a second reference signal;
- a reference signal corresponding to the same TRP identifier information as a channel or a reference signal scheduled by the network side device;
- a reference signal corresponding to the same TRP identifier information as a channel or a reference signal indicated by the indication information;
- an eighth preset reference signal on a TRP on which information is currently transmitted;
- a ninth preset reference signal on a currently activated TRP;
- a tenth preset reference signal corresponding to preset TRP identifier information;
- an eleventh preset reference signal corresponding to the same TRP identifier information as a reference signal in a current TCI state;
- a twelfth preset reference signal corresponding to the same TRP identifier information as a reference signal in a current spatial relation;
- a thirteenth preset reference signal corresponding to the same TRP identifier information as a current path loss reference signal; and
- a fourteenth preset reference signal corresponding to a second TCI state, where the second TCI state is a preset TCI state in TCI states corresponding to a second TCI codepoint, and the second TCI codepoint is a preset TCI codepoint in TCI codepoints corresponding to a plurality of TCI states.

The beam information determining apparatus in the embodiments of this application may be an apparatus, or may be an integrated circuit or a chip. The apparatus may be a mobile electronic device, or may be a non-mobile electronic device.

The beam information determining apparatus in the embodiments of this application may be an apparatus with an operating system. The operating system may be an Android operating system, an iOS operating system, or another possible operating system. This is not specifically limited in the embodiments of this application.

An embodiment of this application further provides an electronic device, including a processor, a memory, and a program or an instruction that is stored in the memory and that can be run on the processor. When the program or the instruction is executed by the processor, the processes of the foregoing beam information determining method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 6:
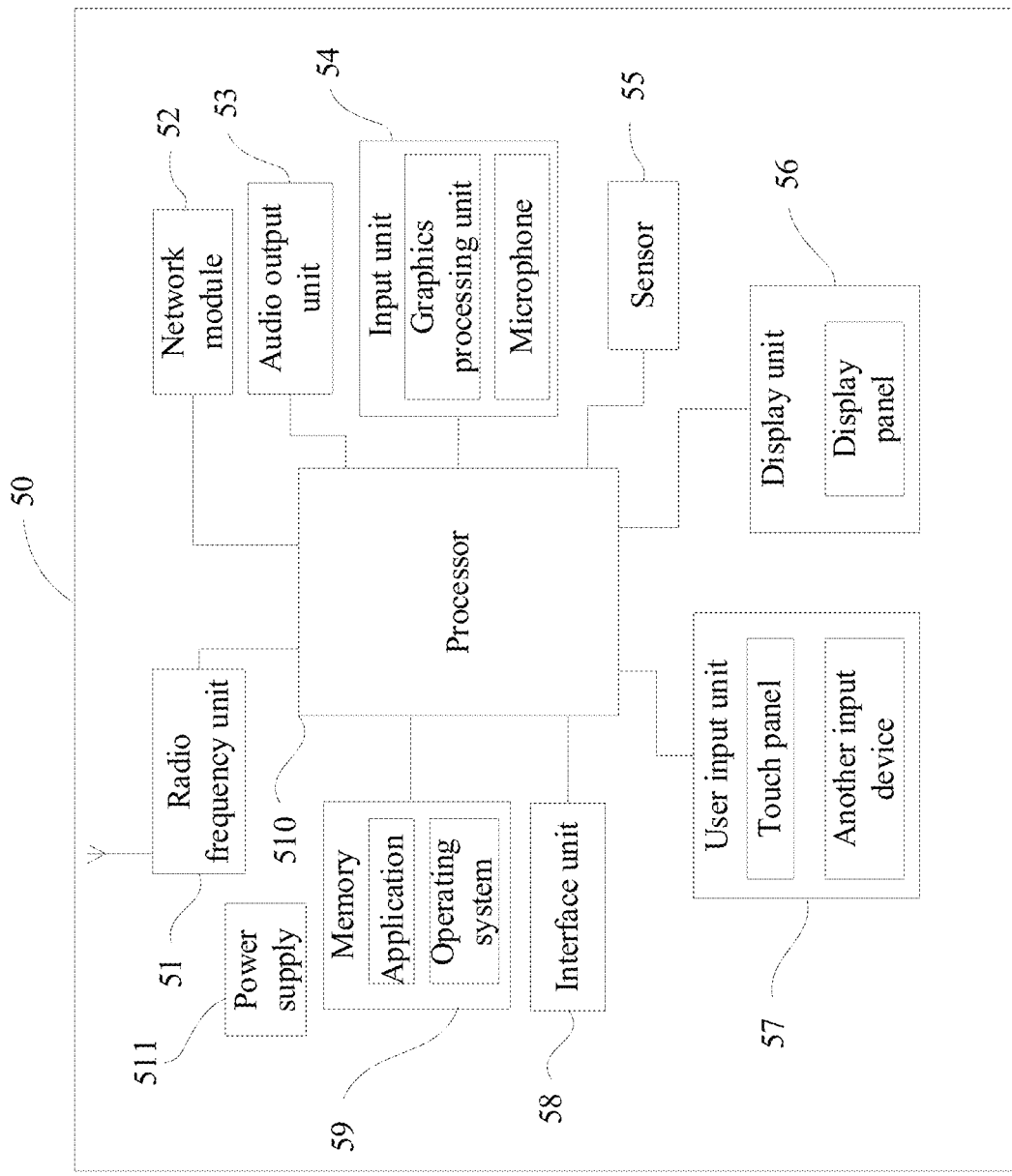
FIG. 6 is a schematic diagram of composition of a terminal according to an embodiment of this application.

The electronic device in this embodiment may be a terminal. FIG. 6 is a schematic diagram of a hardware structure of a terminal according to the embodiments of this application. A terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. It can be understood by a person skilled in the art that, the terminal structure shown in FIG. 6 does not constitute any limitation on the terminal, and the terminal may include more or fewer components than those shown in the figure, or combine some components, or have different component arrangements. In this embodiment of this application, the terminal includes but is not limited to a mobile phone, a tablet computer, a notebook computer, a palmtop computer, an in-vehicle terminal, a wearable device, a pedometer, and the like.

It should be understood that, in this embodiment of this application, the radio frequency unit 51 may be configured to receive and send information or a signal in a call process. For example, after receiving downlink data from a base station, the radio frequency unit 51 sends the downlink data to the processor 510 for processing. In addition, the radio frequency unit 51 sends uplink data to the base station. Usually, the radio frequency unit 51 includes but is not limited to an antenna, at least one amplifier, a transceiver, a coupler, a low noise amplifier, a duplexer, and the like. In addition, the radio frequency unit 51 may communicate with a network and another device through a wireless communication system.

The memory 59 may be configured to store a software program and various data. The memory 59 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 59 may include a high-speed random access memory, and may further include a nonvolatile memory, for example, at least one magnetic disk storage device, a flash storage device, or another volatile solid-state storage device.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or more processing units. In some embodiments, an application processor and a modem processor may be integrated into the processor 510. The application processor mainly processes an operating system, a user interface, an application, and the like. The modem processor mainly processes wireless communications. It can be understood that, in some embodiments, the modem processor may not be integrated into the processor 510.

The terminal 50 may further include the power supply 511 (such as a battery) that supplies power to each component. In some embodiments, the power supply 511 may be logically connected to the processor 510 by using a power management system, so as to implement functions such as charging, discharging, and power consumption management by using the power management system.

In addition, the terminal 50 includes some function modules not shown, and details are not described herein.

Figure 7:
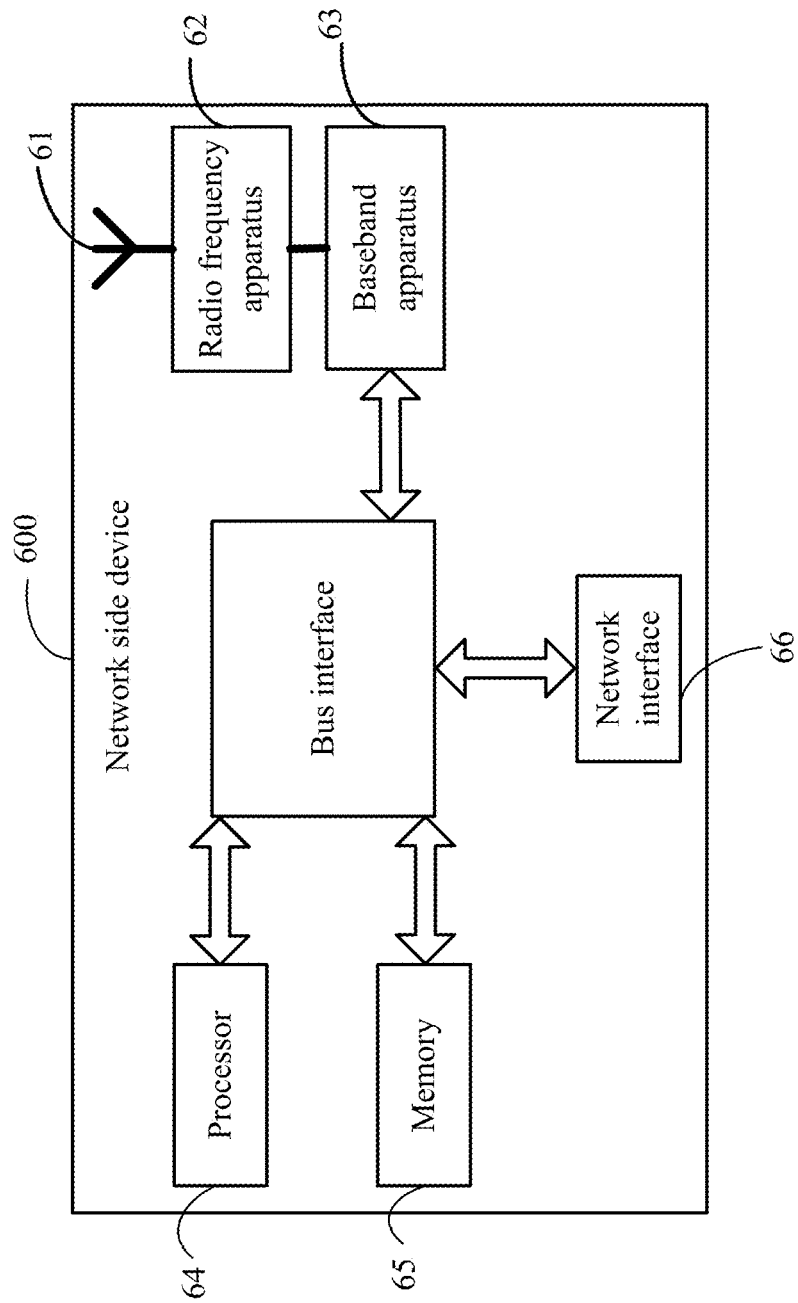
FIG. 7 is a schematic diagram of composition of a network side device according to an embodiment of this application.

The electronic device in this embodiment may be a network side device. As shown in FIG. 7, a network side device 600 includes an antenna 61, a radio frequency apparatus 62, and a baseband apparatus 63. The antenna 61 is connected to the radio frequency apparatus 62. In an uplink direction, the radio frequency apparatus 62 receives information by using the antenna 61, and sends the received information to the baseband apparatus 63 for processing. In a downlink direction, the baseband apparatus 63 processes information that needs to be sent, and sends processed information to the radio frequency apparatus 62. The radio frequency apparatus 62 processes the received information, and sends processed information by using the antenna 61.

The frequency band processing apparatus may be located in the baseband apparatus 63. The method performed by the network side device in the foregoing embodiment may be implemented in the baseband apparatus 63. The baseband apparatus 63 includes a processor 64 and a memory 65.

The baseband apparatus 63 may include, for example, at least one baseband board, where a plurality of chips are disposed on the baseband board. As shown in FIG. 7, one chip is, for example, the processor 64, which is connected to the memory 65, so as to invoke a program in the memory 65 to perform operations of the network side device shown in the foregoing method embodiment.

The baseband apparatus 63 may further include a network interface 66, configured to exchange information with the radio frequency apparatus 62. For example, the interface is a Common Public Radio Interface (CPRI).

The processor herein may be one processor, or may be a general name of a plurality of processing elements. For example, the processor may be a CPU, or may be an ASIC, or one or more integrated circuits configured to implement the method performed by the foregoing network side device, for example, one or more microprocessors DSP, or one or more field programmable gate arrays FPGAs. The storage element may be a memory, or may be a general term of a plurality of storage elements.

The memory 65 may be a volatile memory or a nonvolatile memory, or may include a volatile memory and a nonvolatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DRRAM). The memory 65 described in this specification is intended to include but not limited to these memories and any memory of another proper type.

An embodiment of this application further provides a readable storage medium. The readable storage medium stores a program or an instruction, and when the program or the instruction is executed by a processor, the processes of the foregoing beam information determining method embodiment are implemented and a same technical effect can be achieved. To avoid repetition, details are not described herein again.

The processor is a processor in the electronic device in the foregoing embodiment. The readable storage medium includes a computer-readable storage medium, such as a computer ROM, an RAM, a magnetic disk, or an optical disc.

An embodiment of this application further provides a chip. The chip includes a processor and a communications interface, the communications interface is coupled to the processor, and the processor is configured to run a program or an instruction to implement the processes of the foregoing beam information determining method embodiment and a same technical effect can be achieved. To avoid repetition, details are not described herein again.

It should be understood that the chip mentioned in this embodiment of this application may also be referred to as a system-level chip, a system chip, a chip system, or an on-chip system chip.

It can be understood that the embodiments described in the present disclosure may be implemented by hardware, software, firmware, middleware, microcode, or a combination thereof. For hardware implementation, a module, a unit, a submodule, a subunit, or the like may be implemented in one or more Application Specific Integrated Circuits (ASICs), Digital Signal Processors (DSPs), DSP Devices (DSPDs), Programmable Logic Devices (PLDs), Field-Programmable Gate Arrays (FPGAs), general purpose processors, controllers, microcontrollers, microprocessors, or other electronic units or a combination thereof used to perform the functions in this application.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In some embodiments, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A beam information determining method, performed by a terminal, comprising:
   receiving indication information from a network side device; and
   when a target reference signal corresponding to the indication information does not meet a preset detection condition, rolling back to a preset reference signal for transmission,
   wherein the preset detection condition comprises one of the following:
      the number of times that the terminal does not receive the target reference signal is greater than or equal to a first preset value,
      the number of times that the terminal receives the target reference signal and a quality evaluation value of the received target reference signal is less than or equal to a second preset value is greater than or equal to the first preset value,
      duration for which the terminal does not receive the target reference signal is greater than or equal to a target preset duration, or
      duration, for which the terminal receives the target reference signal and the quality evaluation value of the received target reference signal is less than or equal to the second preset value, is greater than or equal to the target preset duration.

2. The beam information determining method according to claim 1, wherein
   the indication information is used to indicate beam switching or beam updating of a channel or a reference signal; or
   the indication information is used to indicate switching or updating of a path loss reference signal of a channel or a reference signal.

3. The beam information determining method according to claim 2, wherein when the indication information is used to indicate beam switching or beam updating of a channel or a reference signal,
  at a time location T1 after the indication information is received, the method further comprises: starting transmission or determining whether the target reference signal meets the preset detection condition.

4. The beam information determining method according to claim 3, wherein the time location T1 is one of the following:
  a first time location at which the terminal receives the indication information;
  a second time location after the terminal receives the indication information, wherein an interval between the second time location and the first time location is a first preset duration;
  a third time location at which the terminal sends acknowledgment information of the indication information; or
  a fourth time location after the terminal sends the acknowledgment information, wherein an interval between the fourth time location and the third time location is a second preset duration.

5. The beam information determining method according to claim 2, wherein when the indication information is used to indicate switching or updating of a path loss reference signal of a channel or a reference signal,
  at a time location T2 after the indication information is received, starting transmission or determining whether the target reference signal meets the preset detection condition.

6. The beam information determining method according to claim 5, wherein
  the target reference signal is a target path loss reference signal, and the terminal receives and measures a current path loss reference signal and the target path loss reference signal in a first time period K1, and
  wherein
  the preset reference signal is a preset path loss reference signal, and the terminal receives and measures a current path loss reference signal and the preset path loss reference signal in a second time period K2.

7. The beam information determining method according to claim 1, wherein the indication information is at least one of the following:
  Radio Resource Control (RRC) signaling for configuring a Transmission Configuration Indicator (TCI) state of a Physical Downlink Control Channel (PDCCH);
  a Media Access Control (MAC) Control Element (CE) command for activating the TCI state of the PDCCH;
  a MAC CE command for activating a TCI state of a Physical Downlink Shared Channel (PDSCH);
  Downlink Control Information (DCI) signaling for indicating the TCI state of the PDSCH;
  RRC signaling for configuring a TCI state of a Channel State Information-Reference Signal (CSI-RS);
  a MAC CE command for activating the TCI state of the CSI-RS;
  DCI signaling for indicating the TCI state of the CSI-RS;
  RRC signaling for configuring a spatial relation of a Physical Uplink Control Channel (PUCCH);
  a MAC CE command for activating the spatial relation of the PUCCH;
  RRC signaling for configuring a spatial relation of a Sounding Reference Signal (SRS);
  a MAC CE command for activating the spatial relation of the SRS;
  DCI signaling for indicating the spatial relation of the SRS;
  RRC signaling for configuring a path loss reference signal of the PUCCH;
  a MAC CE command for activating the path loss reference signal of the PUCCH;
  DCI signaling for indicating the path loss reference signal of the PUCCH;
  a MAC CE command for activating a spatial relation of a Physical Uplink Shared Channel (PUSCH);
  RRC signaling for configuring a path loss reference signal of the PUSCH;
  a MAC CE command for activating the path loss reference signal of the PUSCH;
  RRC signaling for configuring a path loss reference signal of the SRS; or
  a MAC CE command for activating the path loss reference signal of the SRS.

8. The beam information determining method according to claim 1, further comprising:
  when the target reference signal corresponding to the indication information meets the preset detection condition, performing transmission according to the target reference signal.

9. The beam information determining method according to claim 1, wherein when the target reference signal corresponding to the indication information does not meet the preset detection condition, the method further comprises at least one of the following:
  stopping transmission of the target reference signal;
  stopping beam switching; or
  stopping switching or updating of a path loss reference signal.

10. The beam information determining method according to claim 1, wherein the rolling back to a preset reference signal for transmission comprises:
  rolling back to the preset reference signal for transmission according to a configuration of the network side device or a stipulation in a protocol.

11. The beam information determining method according to claim 1, wherein after the rolling back to a preset reference signal for transmission, the method further comprises at least one of the following:
  transmitting the preset reference signal;
  transmitting a first channel or a first reference signal corresponding to the preset reference signal;
  transmitting a channel or a reference signal scheduled by the network side device;
  transmitting a channel or a reference signal indicated by the indication information; or
  performing path loss measurement.

12. The beam information determining method according to claim 1, wherein the preset reference signal is at least one of the following:
  a Synchronization Signal Block (SSB) determined by the terminal in a random access process;
  a reference signal in a Transmission Configuration Indicator (TCI) state or a Quasi Co-Location (QCL) hypothesis of a control resource set with a preset index or identifier;
  a reference signal corresponding to a candidate TCI state configured by the network side device or a specified TCI state in a TCI state pool;
  a reference signal corresponding to a candidate spatial relation configured by the network side device or a specified spatial relation in a spatial relation pool;

a candidate path loss reference signal configured by the network side device or a specified path loss reference signal in a path loss reference signal pool;

a reference signal in a spatial relation of a Physical Uplink Control Channel (PUCCH) with a preset index or identifier;

a path loss reference signal of the PUCCH with the preset index or identifier;

a reference signal in a TCI state with a preset index or identifier in TCI states of a Physical Downlink Shared Channel (PDSCH) configured or activated by the network side device;

a reference signal on a preset cell; or a reference signal on a preset Bandwidth Part (BWP).

13. The beam information determining method according to claim 1, wherein the preset reference signal is at least one of the following:

a reference signal corresponding to the same Transmission/Reception Point (TRP) identifier information as a first channel or a first reference signal;

a reference signal corresponding to the same TRP identifier information as a channel or a reference signal scheduled by the network side device;

a reference signal corresponding to the same TRP identifier information as a channel or a reference signal indicated by the indication information;

a first preset reference signal on a TRP on which information is currently transmitted;

a second preset reference signal on a currently activated TRP;

a third preset reference signal corresponding to preset TRP identifier information;

a fourth preset reference signal corresponding to the same TRP identifier information as a reference signal in a current Transmission Configuration Indicator (TCI) state;

a fifth preset reference signal corresponding to the same TRP identifier information as a reference signal in a current spatial relation;

a sixth preset reference signal corresponding to the same TRP identifier information as a current path loss reference signal; or a seventh preset reference signal corresponding to a first TCI state, wherein the first TCI state is a preset TCI state in TCI states corresponding to a first TCI codepoint, and the first TCI codepoint is a preset TCI codepoint in TCI codepoints corresponding to a plurality of TCI states.

14. An electronic device, comprising: a memory having a computer program stored thereon; and a processor, wherein the computer program, when executed by the processor, causes the processor to perform a beam information determining method, comprising:

receiving indication information from a network side device; and when a target reference signal corresponding to the indication information does not meet a preset detection condition, rolling back to a preset reference signal for transmission, wherein the preset detection condition comprises one of the following:

the number of times that the terminal does not receive the target reference signal is greater than or equal to a first preset value, the number of times that the terminal receives the target reference signal and a quality evaluation value of the received target reference signal is less than or equal to a second preset value is greater than or equal to the first preset value, duration for which the terminal does not receive the target reference signal is greater than or equal to a target preset duration, or duration, for which the terminal receives the target reference signal and the quality evaluation value of the received target reference signal is less than or equal to the second preset value is greater than or equal to the target preset duration.

15. The electronic device according to claim 14, wherein the indication information is used to indicate beam switching or beam updating of a channel or a reference signal; or the indication information is used to indicate switching or updating of a path loss reference signal of a channel or a reference signal.

16. The electronic device according to claim 15, wherein when the indication information is used to indicate beam switching or beam updating of a channel or a reference signal, at a time location T1 after the indication information is received, the method further comprises: starting transmission or determining whether the target reference signal meets the preset detection condition.

17. The electronic device according to claim 14, wherein when the target reference signal corresponding to the indication information does not meet the preset detection condition, the method further comprises at least one of the following:

stopping transmission of the target reference signal;
stopping beam switching; or
stopping switching or updating of a path loss reference signal.

18. The electronic device according to claim 14, wherein rolling back to the preset reference signal for transmission comprises:

rolling back to the preset reference signal for transmission according to a configuration of the network side device or a stipulation in a protocol.

19. An electronic device, comprising: a memory having a computer program stored thereon; and a processor, wherein the computer program, when executed by the processor, causes the processor to perform a beam information determining method, comprising:

sending indication information to a terminal; and when a target reference signal corresponding to the indication information does not meet a preset detection condition, rolling back to a preset reference signal for transmission, wherein the preset detection condition comprises one of the following:

the number of times that the terminal does not receive the target reference signal is greater than or equal to a first preset value, the number of times that the terminal receives the target reference signal and a quality evaluation value of the received target reference signal is less than or equal to a second preset value is greater than or equal to the first preset value, duration for which the terminal does not receive the target reference signal is greater than or equal to a target preset duration, or duration, for which the terminal receives the target reference signal and the quality evaluation value of the received target reference signal is less than or equal to the second preset value, is greater than or equal to the target preset duration.

* * * * *